United States Patent
Chu et al.

(10) Patent No.: US 6,944,130 B1
(45) Date of Patent: Sep. 13, 2005

(54) METHOD AND APPARATUS FOR DETERMINING A LAYER 2 PATH IN A SWITCHED NETWORK

(75) Inventors: Clare Chu, Fremont, CA (US); Stephen Schleimer, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 807 days.

(21) Appl. No.: 09/585,709

(22) Filed: May 31, 2000

(51) Int. Cl.⁷ .......................... H04L 12/26; H04L 12/28
(52) U.S. Cl. .................... 370/238.1; 370/252; 370/254; 370/389; 370/400; 370/395.53
(58) Field of Search ............................ 370/238–238.1, 370/252, 469, 254–256, 389–392, 400–406, 395.1–395.54; 709/227–228, 238–244

(56) References Cited

U.S. PATENT DOCUMENTS

| | | | | |
|---|---|---|---|---|
| 5,251,205 A | * | 10/1993 | Callon et al. | 370/392 |
| 5,491,690 A | * | 2/1996 | Alfonsi et al. | 370/255 |
| 5,521,910 A | * | 5/1996 | Matthews | 370/256 |
| 5,926,463 A | * | 7/1999 | Ahearn et al. | 370/254 |
| 6,172,981 B1 | * | 1/2001 | Cox et al. | 370/401 |
| 6,256,295 B1 | * | 7/2001 | Callon | 370/254 |
| 6,304,912 B1 | * | 10/2001 | Oguchi et al. | 709/238 |
| 6,396,488 B1 | | 5/2002 | Simmons et al. | |
| 6,522,627 B1 | | 2/2003 | Mauger | |
| 6,542,469 B1 | * | 4/2003 | Kelley et al. | 370/238 |
| 6,578,086 B1 | | 6/2003 | Regan et al. | |
| 6,614,765 B1 | | 9/2003 | Bruno et al. | |
| 6,625,658 B1 | * | 9/2003 | Oguchi et al. | 709/238 |
| 6,711,152 B1 | | 3/2004 | Kalmanek et al. | |
| 6,711,171 B1 | | 3/2004 | Dobbins et al. | |

* cited by examiner

*Primary Examiner*—Steven Nguyen
(74) *Attorney, Agent, or Firm*—Hickman Palermo Truong & Becker LLP

(57) ABSTRACT

A method and apparatus that provide for a Layer 2 path determination are disclosed. In one embodiment of the invention, a Layer 3 path between a source device and destination device is first determined in order to identify contiguous pairs of Layer 3 devices. A subpath is then determined for each contiguous pair of Layer 3 devices based on VLAN and spanning tree information associated with the contiguous pair. The Layer 2 path is a concatenation of the subpaths of all the contiguous pairs in the Layer 3 path.

40 Claims, 13 Drawing Sheets

METHOD AND APPARATUS FOR DETERMINING A LAYER 2 PATH IN A SWITCHED NETWORK

FIELD OF INVENTION

The present invention generally relates to management of computer networks, and relates more specifically to determining a Layer 2 path between two or more nodes in a switched network.

BACKGROUND OF THE INVENTION

A computer network generally includes a number of devices, including switches, routers and hubs, connected so as to allow communication among the devices. The devices within a network are often categorized into two classes: end stations such as workstations, desktop PCs, printers, servers, hosts, fax machines, and devices that primarily supply or consume information; and network devices such as gateways, switches and routers that primarily forward information between the other devices.

Network devices ordinarily operate on a continuous basis. Each device has one or more circuit boards, a microprocessor and a memory, and runs a control program. In general, networks often include several different types of data switching and routing devices. These network devices may have different physical characteristics. New devices, with characteristics that are presently unknown, are constantly being developed. In addition, the characteristics of many network devices may change over time. For example, characteristics of the network devices change when subsystems like boards, network interface modules, and other parts are added or removed from a device.

Many networks are managed, supervised and maintained by a network administrator or network manager. To properly maintain a network, the network administrator needs to have up-to-date information available about the devices in the network, how the devices are interconnected, and how data packets move among devices along logical and physical paths. The Open Systems Interconnection ("OSI") network reference model is useful in classifying logical communication layers of network devices that can be used to collect network management information. Layer 2 and Layer 3 refer to the data link layer and the network layer respectively in the OSI model.

Layer 2 connectivity information may be used by the network administrator to determine and understand the physical topology of the network. The topology is a representation of the type of devices that are currently included in the network and how the interfaces of these devices are physically linked. Layer 3 information describes logical connectivity between a source and a destination device as specified by intermediary Layer 3 routing devices.

An effective network management system would create a topology based on both the logical connections of network devices, and the physical connection information. Not only would the network management system be capable of logically identifying to which network a particular device is linked, based on Layer 3 information, it would also indicate how individual devices are physically linked together, based on Layer 2 information. Thus, an administrator could determine the actual interface links or physical connectivity of each of the devices. This information may be critical in determining how the network can be expanded or upgraded, or in troubleshooting. Certain proprietary discovery protocols have been developed to help identify how the interfaces of each device are physically linked within a network, based on Layer 2 information. For example, the Cisco Discovery Protocol ("CDP"), which is used in products that are commercially available from Cisco Systems, Inc., San Jose, Calif., is a low-level communication protocol that can help a network management system identify how devices are linked in a network. When a device supporting CDP sends a message to another device, the message includes a packet that contains its IP address and an interface descriptor. The interface descriptor represents the logical name of the port from which the message was sent. The information is stored at the receiving device and may be used to determine how two devices are physically connected.

However, knowledge of the physical topology of the network may not be sufficient for diagnosing an error in the network. To diagnose certain errors, logical path information is needed. One technique of gathering information on errors and configuration in a network that uses Internet Protocol ("IP") is path tracing for an IP packet. Path information defines the traversal of a packet or a sequence of packets from a source device to a destination device, whereas topology information defines either the physical or logical layout of a network without taking into account factors that affect the path traversed by a packet. The factors that affect the path traversed by a packet include spanning tree blocking, route determination, network misconfiguration, access-list prohibition, cable cuts, etc.

FIG. 1A is a block diagram of a network that illustrates the difference between path and topology. Access Switches 102a, 104a are connected to users 102b, 104b respectively. Core Switch 110 is connected to Backbone 11 2. Core Switch 110 is connected to A Switch 102a and Access Switch 104a by intermediary devices such as Distribution Switch 106 and Root Bridge 108.

Access Switch 102a is connected to Distribution Switch 106 by Connection 118 through Access Ports 118a, 118b. Similarly, Access Switch 102a is connected to Root Bridge 108 by Connection 114 and through Access Ports 114a, 114b.

Access Switch 104a is connected to Distribution Switch 106 by Connection 116 through Access Ports 116a, 116b. Also, Access Switch 104a is connected to Root Bridge 108 by Connection 120 and through Access Ports 120a, 120b. Core Switch 110 is connected to Distribution Switch 106 by Connection 122 and Access Ports 122a, 122b. Core Switch 110 is also connected to Root Bridge 108 by Connection 124 and Access Ports 124a, 124b.

The layout of the network as depicted by the connections between the devices in FIG. 1A is referred to as the topology of the network. In contrast, the path that a packet would traverse from a source device to a destination device would vary depending on the Spanning Tree information for the network.

The Spanning Tree protocol, defined in IEEE Specification 802.1D, is a method used to determine a "loop-free" subset of a network topology. In the context of Spanning Tree, a "loop" is a path on which packets never reach their destination, but cycle repeatedly through a series of devices that comprise the loop. FIG. 1B is a block diagram that illustrates a loop in a network. A packet that may be originating from Access Switch 102a and destined for Access Switch 104a would never reach Access Switch 104a by traversing the loop path comprising Connections 118, 122, 124, 114.

By applying the Spanning Tree algorithm to a given network topology, loop paths are prevented by determining which access ports in the topology should be placed in a "blocked state" in order to create a loop-free Spanning Tree for the given network. For example, referring to FIG. 1A, Access Ports 114a, 114b, 116a, 116b can be placed in a blocked state as a result of applying a Spanning Tree algorithm to the network of FIG. 1A. Because Access Ports 114a, 114b, 116a, 116b are in the blocked state, a loop-free Spanning Tree is achieved, comprising Connections 118, 122, 124, 120, and Connections 114, 116 are shown as dotted lines to indicate that they are not part of the Spanning Tree. Thus, for the purposes of illustration, the solid lines as shown in FIG. 1C indicate the Spanning Tree.

For most accurate path tracing, it is desirable for IP path tracing to be performed both at Layer 3 and Layer 2. A Layer 2 IP path is also referred to as a "data link path". A data link path is important for network monitoring and diagnostics because the information obtained from IP path tracing performed at Layer 3 may be insufficient. For example, IP path tracing at Layer 3 identifies a path from router to router and does not identify the actual network devices such as LANs switches and bridges that an IP packet may traverse to get from a source device to a destination device. Thus, the path between any two Layer 3 devices may traverse entire networks of devices that operate at Layer 2.

Tools such as the UNIX-based traceroute computer program and the Windowsbased tracert computer program are used to perform IP path tracing at Layer 3. However, techniques for direct IP tracing at Layer 2 that are suitable for a wide range of technologies including Ethernet, Local Area Network Emulation, Token Ring, and EtherChannel are not available.

Based on the foregoing, there is a clear need for a method that can identify the data link path from a source device to a destination device on the network.

There is a specific need for a way to carry out IP Path tracing at OSI Layer 2 for use in network management functions.

SUMMARY OF THE INVENTION

The foregoing needs, and other needs and objects that will become apparent from the following description, are achieved in the present invention, which comprises, in one aspect, a method determining a Layer 2 path between a source device and a destination device in a switched network, the method comprising the computer-implemented steps of: determining a Layer 3 path between the source device and the destination device, wherein the Layer 3 path comprises information identifying two or more Layer 3 devices; determining a subpath for each contiguous pair of Layer 3 devices in the Layer 3 path; and concatenating the subpaths result in creating and storing information representing the Layer 2 path.

One feature of this aspect is that determining a subpath for each contiguous pair of Layer 3 devices comprises the steps of: determining a first interface on a first node of the contiguous pair that is connected to a second interface on a second node of the contiguous pair for a given subnet; and selecting a relevant VLAN between the first and second nodes of the contiguous pair based on the first and second interfaces; and gathering current spanning tree information for the relevant VLAN.

According to another feature of this aspect is that selecting a relevant VLAN between the first an second nodes of the contiguous pair comprises the steps of: selecting a matching native VLAN of the first and second node of the contiguous pair as the relevant VLAN when the first interface and the second interface of the first and second nodes respectively of the contiguous pair are non-VLAN trunking interfaces; selecting a matching active VLAN that is designated to carry traffic to a next hop as the relevant VLAN when the first interface and the second interface of the first and second nodes respectively of the contiguous pair are VLAN trunking interfaces; and selecting a native VLAN that is on a non-VLAN trunking interface as the relevant VLAN when one of the first and second nodes of the contiguous pair has the non-VLAN trunking interface.

According to other feature, determining a subpath for each contiguous pair of Layer 3 devices further comprises the steps of: tracing a first path segment from a first node of the contiguous pair by following a spanning tree associated with a relevant VLAN for the contiguous pair to a root of the spanning tree; tracing a second path segment from a second node of the contiguous air by following the spanning tree associated with the relevant VLAN for the contiguous air to the root of the spanning tree; and concatenating the first and second path segments to result in creating and storing the subpath for the contiguous pair.

In another feature, concatenating the first path segment and the second path segment to result in creating and storing the subpath for the contiguous pair includes the step of eliminating extraneous devices from the first and second path segments.

In another feature, concatenating the subpaths to result in creating and storing information representing the Layer 2 path includes the step of eliminating extraneous devices from the subpaths.

According to another aspect of determining a Layer 2 path between a source device and a destination device in a switched network, the method comprises the computer-implemented steps of: determining a Layer 3 path between the source device and the destination device, wherein the Layer 3 path comprises information identifying two or more Layer 3 devices; identifying contiguous pairs of Layer 3 devices in the Layer 3 path; determining a subpath for each contiguous pair of Layer 3 devices in the Layer 3 path; determining whether any contiguous pair of Layer 3 devices has no subpath; concluding that there is no Layer 2 path when any contiguous pair of Layer 3 devices has no subpath; eliminating extraneous devices in the subpaths; and concatenating the subpaths to result in creating and storing information representing the Layer 2 path when each of the contiguous pairs of Layer 3 devices has a subpath.

According to one feature of this aspect is that determining a subpath for each contiguous pair of Layer 3 devices comprises the steps of: determining a first interface on a first node of the contiguous pair that is connected to a second interface on a second node of the contiguous pair for a given subnet when both the first node of the contiguous pair and the second node of the contiguous pair have non-trunking interfaces; determining a first native VLAN of the first interface and a second native VLAN the second interface; determining whether the first native VLAN matches the second native VLAN; selecting the matching VLAN as a relevant VLAN between the first and second nodes of the contiguous pair when the first native VLAN matches the second native VLAN; gathering a current spanning tree information for the relevant VLAN; tracing a first path segment from the first node of the contiguous pair to a root of the spanning tree by following the current spanning tree information associated with the relevant VLAN to a root of the spanning tree; tracing a second path segment from the second node of the contiguous pair to the root of the spanning tree by following the current spanning tree information associated with the relevant VLAN; eliminating extraneous devices in the first and second path segments; and concatenating the first path segment and the second path segment to result in creating and storing the subpath for the contiguous pair.

In another feature, determining a subpath for each contiguous pair of Layer 3 devices comprises the steps of: determining a non-trunking node of the contiguous pair when one of the nodes of the contiguous pair for a given subnet has a non-trunking interface and the other node of the contiguous pair has a trunking interface; determining the non-trunking interface on the non-trunking node of the contiguous pair as a first interface that is connected to a second interface on the other node of the contiguous pair; determining a native VLAN on the first interface; determining whether there is an active VLAN on the second interface that matches the native VLAN on the first interface; selecting the matching VLAN as a relevant VLAN between the non-trunking node and the other node of the contiguous pair when there is an active VLAN on the second interface that matches the native VLAN on the first interface; gathering a current spanning tree information for the relevant VLAN; tracing a first path segment from the non-trunking node of the contiguous pair to a root of the spanning tree by following the current spanning tree information associated with the relevant VLAN to a root of the spanning tree; tracing a second path segment from the other node of the contiguous pair to the root of the spanning tree by following the current spanning tree information associated with the relevant VLAN; eliminating extraneous devices in the first and second path segments; and concatenating the first path segment and the second path segment to result in creating and storing the subpath for the contiguous pair.

In another feature, determining a subpath for each contiguous pair of Layer 3 devices comprises the steps of: determining a first interface on a first node of the contiguous pair that is connected to a second interface on a second node of the contiguous pair for a given subnet when both the first node of the contiguous pair and the second node of the contiguous pair have non-trunking interfaces; and determining a first active VLAN of the first interface associated with the given subnet and a second active VLAN the second interface associated with the given subnet; determining whether the first active VLAN matches the second active VLAN; selecting the matching VLAN as a relevant VLAN between the first and second nodes of the contiguous pair when the first active VLAN matches the second active VLAN; gathering a current spanning tree information for the relevant VLAN; tracing a first path segment from the first node of the contiguous pair to a root of the spanning tree by following the current spanning tree information associated with the relevant VLAN to a root of the spanning tree; tracing a second path segment from the second node of the contiguous pair to the root of the spanning tree by following the current spanning tree information associated with the relevant VLAN; eliminating extraneous devices in the first and second path segments; and concatenating the first path segment and the second path segment to result in creating and storing the subpath for the contiguous pair.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for determining a Layer 2 path between two or more nodes in a switched network is disclosed herein. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview

For purposes of illustration, the invention is described in the context of Internet Protocol ("IP") network addressing. The IP standard specifies that each host is assigned a unique 32-bit number known as the host's IP address, which is used for all communication with the host. Each packet sent across an IP network contains the 32-bit IP addresses of the sender (source) as well as the intended recipient (destination).

Figure 1A:
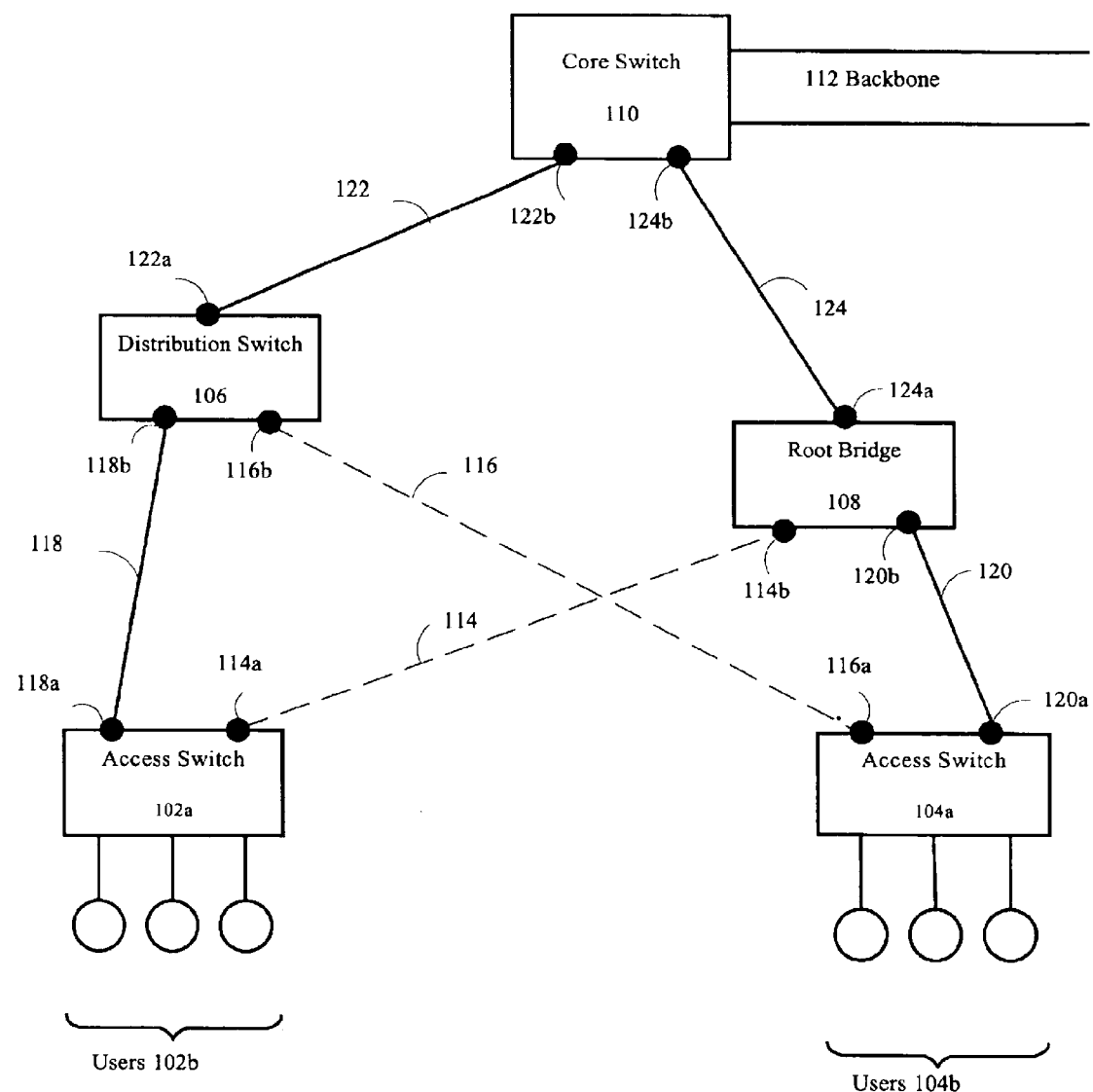
FIG. 1A is a block diagram of a network that illustrates the difference between path through a network and a network topology.
Figure 1B:
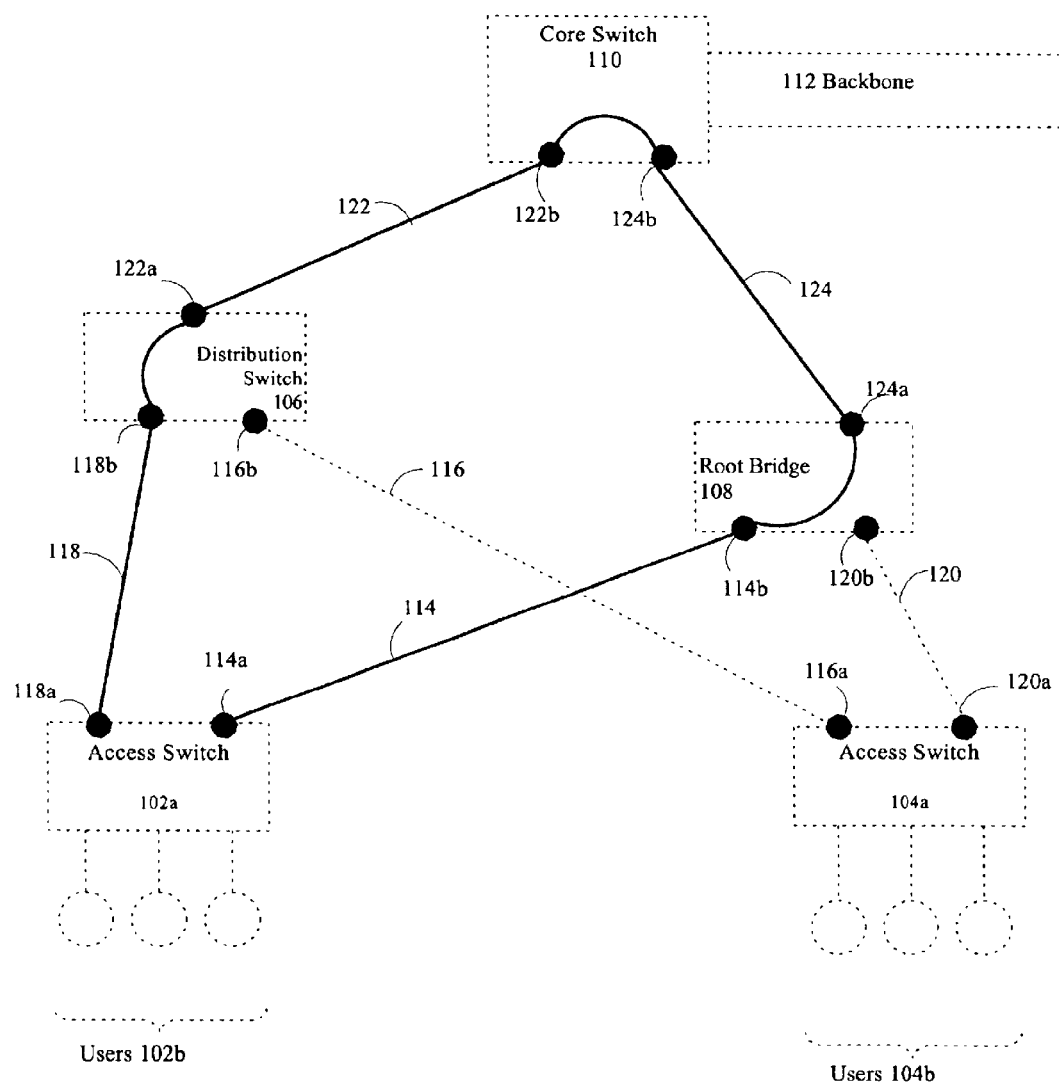
FIG. 1B is a block diagram that illustrates a loop in a network.
Figure 1C:
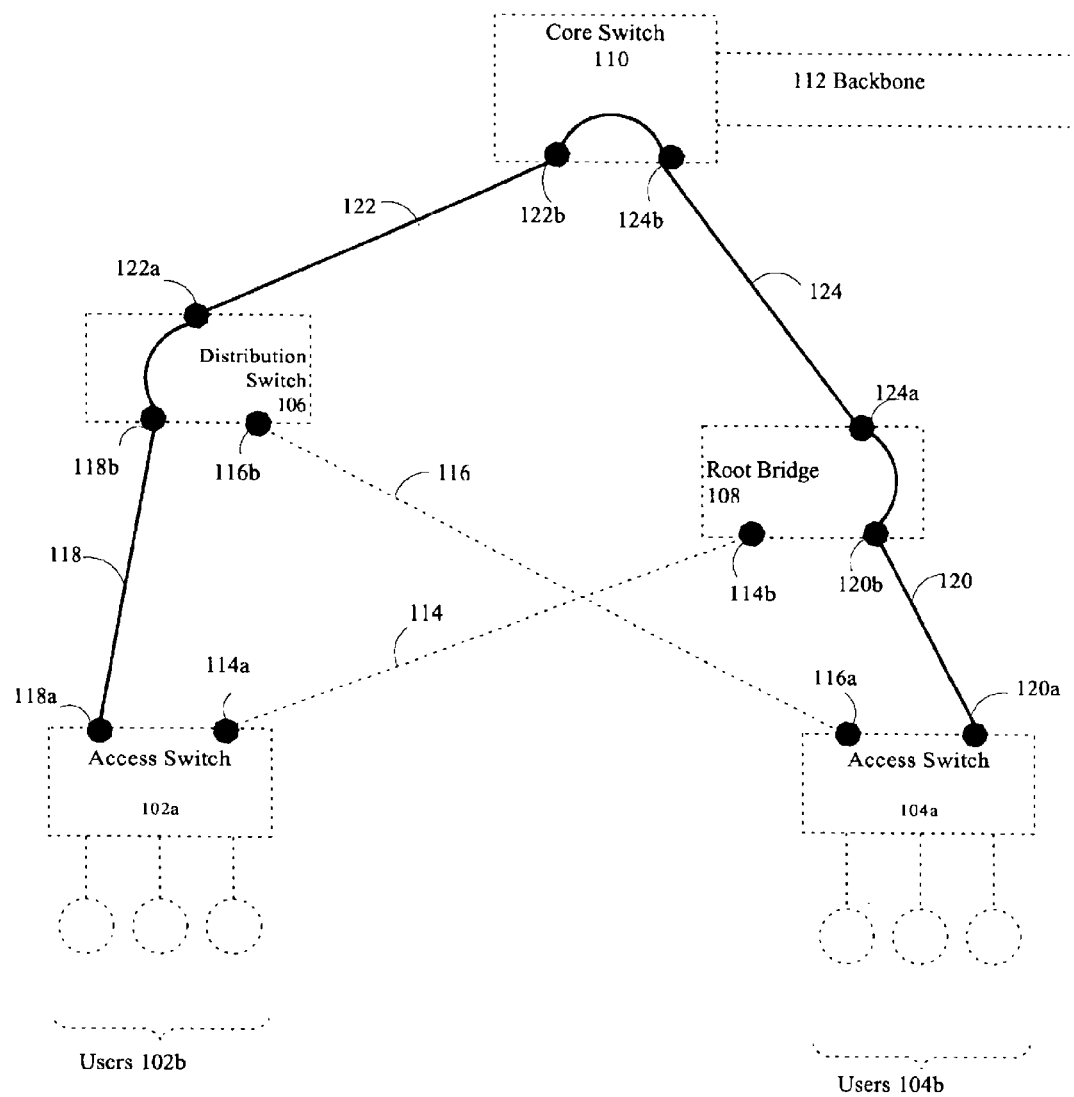
FIG. 1C is a block diagram that illustrates a loop-free path that is created by the Spanning Tree.
Figure 2:
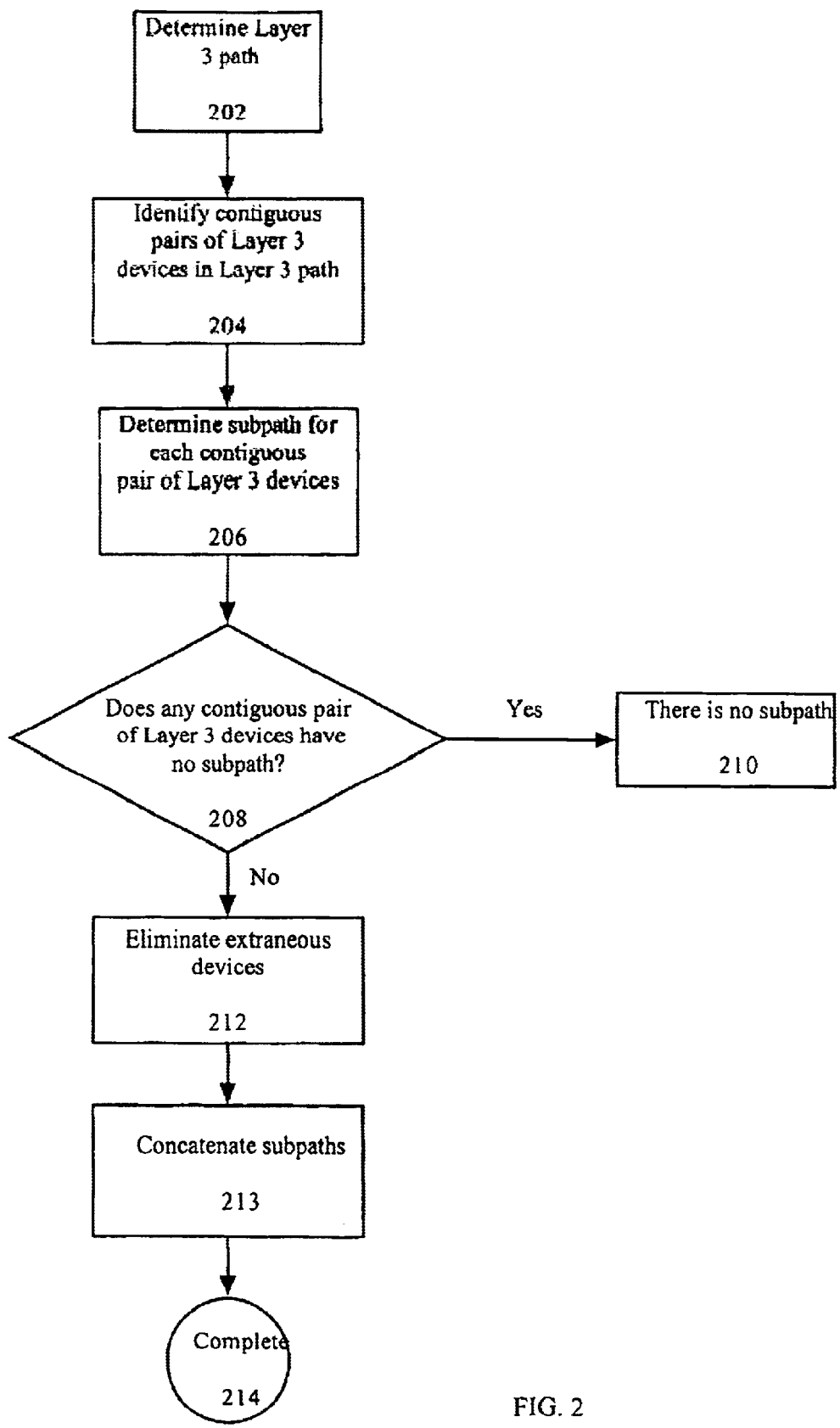
FIG. 2 illustrates an overview of a Layer 2 path analysis.

The flowchart of FIG. 2 illustrates an overview of a Layer 2 path determination. At block 202 a Layer 3 path between a source device and destination device is determined. The Layer 3 path determination is described in greater detail below.

Once a Layer 3 path is determined, all the Layer 3 devices in the Layer 3 path between the source and destination device will have been determined. Thus, at block 204, contiguous pairs of Layer 3 devices in the Layer 3 path may be identified.

At block 206, a subpath is determined for each contiguous pair of Layer 3 devices that was determined at block 204. Once the subpaths are determined, the subpaths are concatenated to form a Layer 2 path between the source device and the destination device. Subpath determination is described in greater detail below.

At block 208, the process determines whether any contiguous pair of Layer 3 devices has no subpath. If one or more contiguous pairs of Layer 3 devices have no subpath, then at block 210 the process determines that there is no Layer 2 path between the source device and destination device.

However, if block 208 results in determining that each contiguous pair of Layer 3 devices in the Layer 3 path between the source device and the destination device has a subpath, then at block 212, extraneous devices in the subpaths are eliminated, and the subpaths are concatenated to form a Layer 2 path between the source device and the destination device as shown by block 213. The process of eliminating extraneous devices is further explained herein in the subsection entitled "PATH SEGMENT TRACE". The process of determining a Layer 2 path is complete at block 214 of FIG. 2.

Determination of Layer 3 Path and Contiguous Pairs

The Layer 3 path between a source device and a destination device, as determined in block 202 of FIG. 2, can be traced using the "traceroute" computer program or any process that is capable of accomplishing the equivalent task. The "traceroute" software program is supported by UNIX-based network computers. Windows-based network computers support a similar software program called "tracert". Both traceroute and tracert create and store information defining the path or route comprising specific gateway computers or routers at each "hop" through the computer network between a source computer and the destination computer. In a packet-switching network, a hop is the next intermediate gateway that a packet visits on its way to its destination.

The traceroute program works by sending a packet of data, e.g., using Internet Control Message Protocol (ICMP) to the destination end-station. The packet includes a time limit value ("time to live") that is selected so as to be exceeded by the first gateway that receives the packet. In turn, the gateway returns a Time Exceeded message. The traceroute program increases the time limit value and resends the packet so that it will reach the next gateway in the path to the packet's destination.

Figure 3:
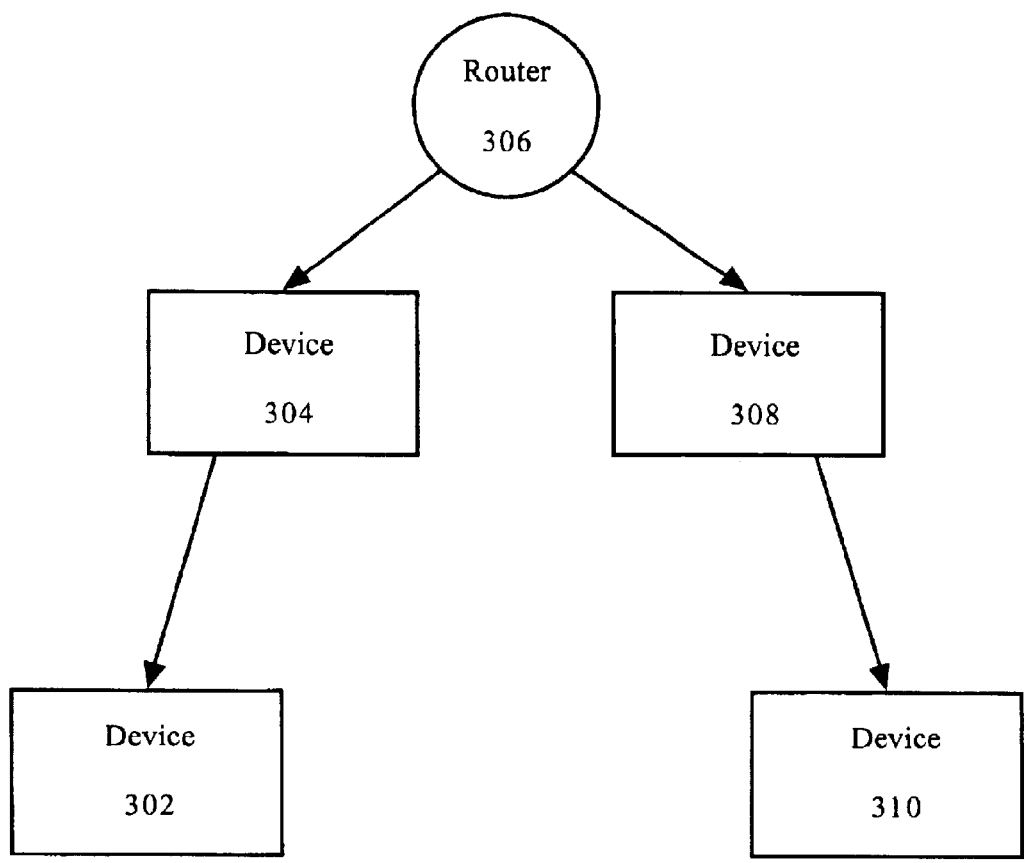
FIG. 3 illustrates the identification of contiguous pairs of Layer 3 devices in a given Layer 3 path.

FIG. 3 illustrates the identification of contiguous pairs of Layer 3 devices in a given Layer 3 path, as determined as part of block 204 of FIG. 2. In FIG. 3, Device 302 and Device 310 are the source device and destination device respectively. Device 304, Device 306 and Device 308 are intermediary devices between Device 302 and Device 310. In particular, Device 306 is a router.

With respect to FIG. 3, assume that a traceroute or some other process is performed to determine the Layer 3 path. Further assume that the Layer 3 path is determined to be as follows:

Layer 3 Path=Device 302->Device 306->Device 310

A Layer 3 contiguous pair is hereafter denoted by (node 1, node 2), where node 1 and node 2 are the two adjacent devices in the Layer 3 path. Thus, the contiguous pairs of Layer 3 devices with respect to FIG. 3 are (Device 302, Device 306) and (Device 306, Device 310).

Determination of Subpaths of Contiguous Pairs

Figure 4:
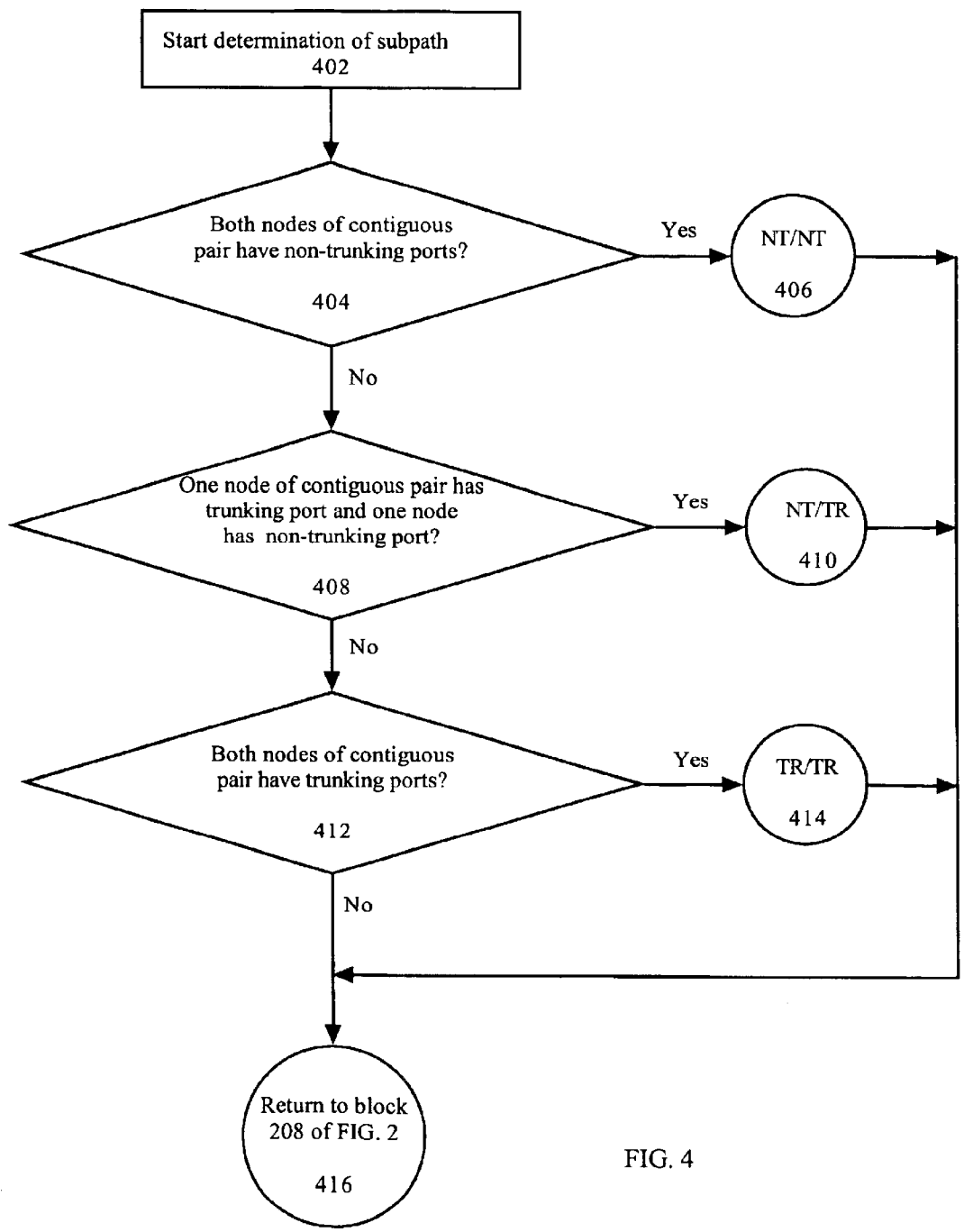
FIG. 4 is a flowchart that illustrates a method of determining subpaths.

FIG. 4 is a flowchart that illustrates a method of determining subpaths of contiguous pairs of devices, as carried out as part of block 206 of FIG. 2. FIG. 4 is described with reference to FIG. 2 because FIG. 4 describes the details of block 206 of FIG. 2. At block 402 of FIG. 4, determination of the subpath for each contiguous pair of Layer 3 devices is started. At block 404, the process determines whether the nodes of a continuous pair are such that both nodes have non-trunking ports. Information on the nodes may be obtained using Cisco Discovery Protocol. If the process determines that both nodes of the contiguous pair have non-trunking ports, then control passes to block 406, which is further described in greater detail with reference to FIG. 5.

However, if at block 404 the process determines that the nodes of the contiguous pair are not such that both nodes of the contiguous pair have non-trunking ports, then at block 408 of FIG. 4, the process determines whether the nodes of the contiguous pair are such that one of the nodes of the contiguous pair has a trunking port and the other node of the contiguous pair has a non-trunking port. If the process determines that one of the nodes of the contiguous pair has a trunking port and the other node of the contiguous pair has a non-trunking port, then control passes to block 410, which is further described in greater detail with reference to FIG. 7.

However, if at block 408 the process determines that the nodes of the contiguous pair are not such that one of the nodes of the contiguous pair has a trunking port and the other node of the contiguous pair has a non-trunking port, then at block 412, the process determines whether the nodes of the contiguous pair are such that both nodes of the contiguous pair have trunking ports. If the process determines that both nodes of the contiguous pair have trunking ports, then control passes to block 414, which is further described in greater detail with reference to FIG. 8 below.

However, if at block 412 the process determines that the nodes of the contiguous pair are not such that both nodes of the contiguous pair have trunking ports, then at block 416 control returns to block 208 of FIG. 2.

1. Non-Trunking Interface to Non-Trunking Interface

Figure 5:
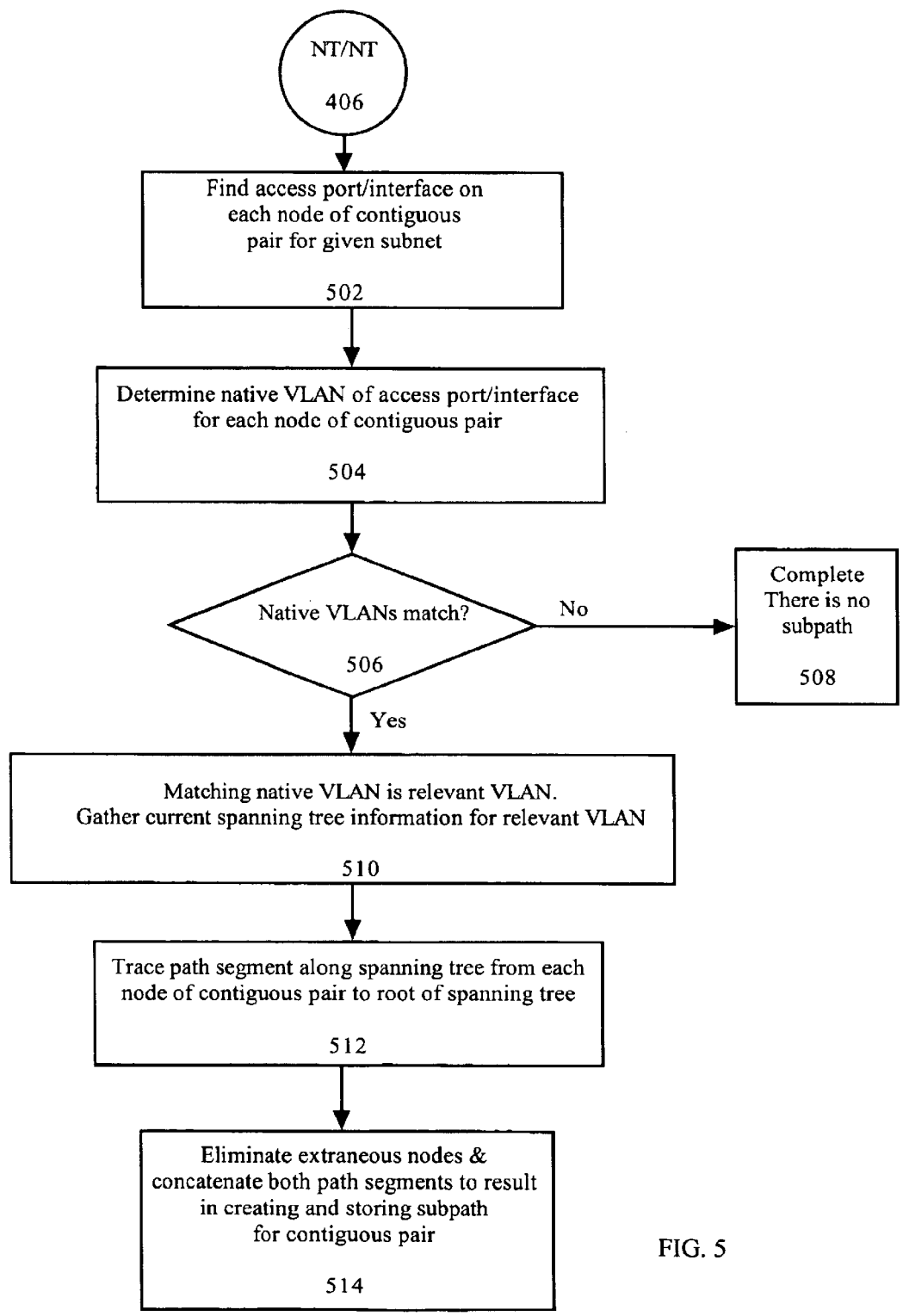
FIG. 5 is a flow chart that illustrates the determination of a subpath when both nodes of a contiguous pair have non-trunking ports or interfaces.

FIG. 5 is a flow chart that illustrates the determination of a subpath when both nodes of a contiguous pair have non-trunking ports or interfaces. At block 502 of FIG. 5, the process finds the access port or interface on each node of the contiguous pair for a given subnet. At block 504, the process determines the native Virtual Local Area Network ("VLAN") of the access port or interface for each node of the contiguous pair.

At block 506, the process determines whether the native VLANs that were determined at block 504 match. If the process determines that the VLANs do not match, then the process of FIG. 5 is complete, and there is no subpath as indicated by block 508. However, if the process determines that the VLANs match, then at block 510, the matching native VLAN is the relevant VLAN and the process gathers the current Spanning Tree information for the relevant VLAN.

At block 512, the process traces a path segment along the Spanning Tree from each node of the contiguous pair to the root of the Spanning Tree. The process of tracing a path segment along the Spanning Tree is described in greater detail with reference to FIG. 6A and FIG. 6B below.

At block 514, the process eliminates extraneous nodes and concatenates the two path segments that were traced at block 512 to result in creating and storing the subpath for the given contiguous pair. The process of eliminating extraneous nodes and concatenating the path segments is described in greater detail with reference to FIG. 6A and FIG. 6B below.

2. Path Segment Trace

Figure 6A:
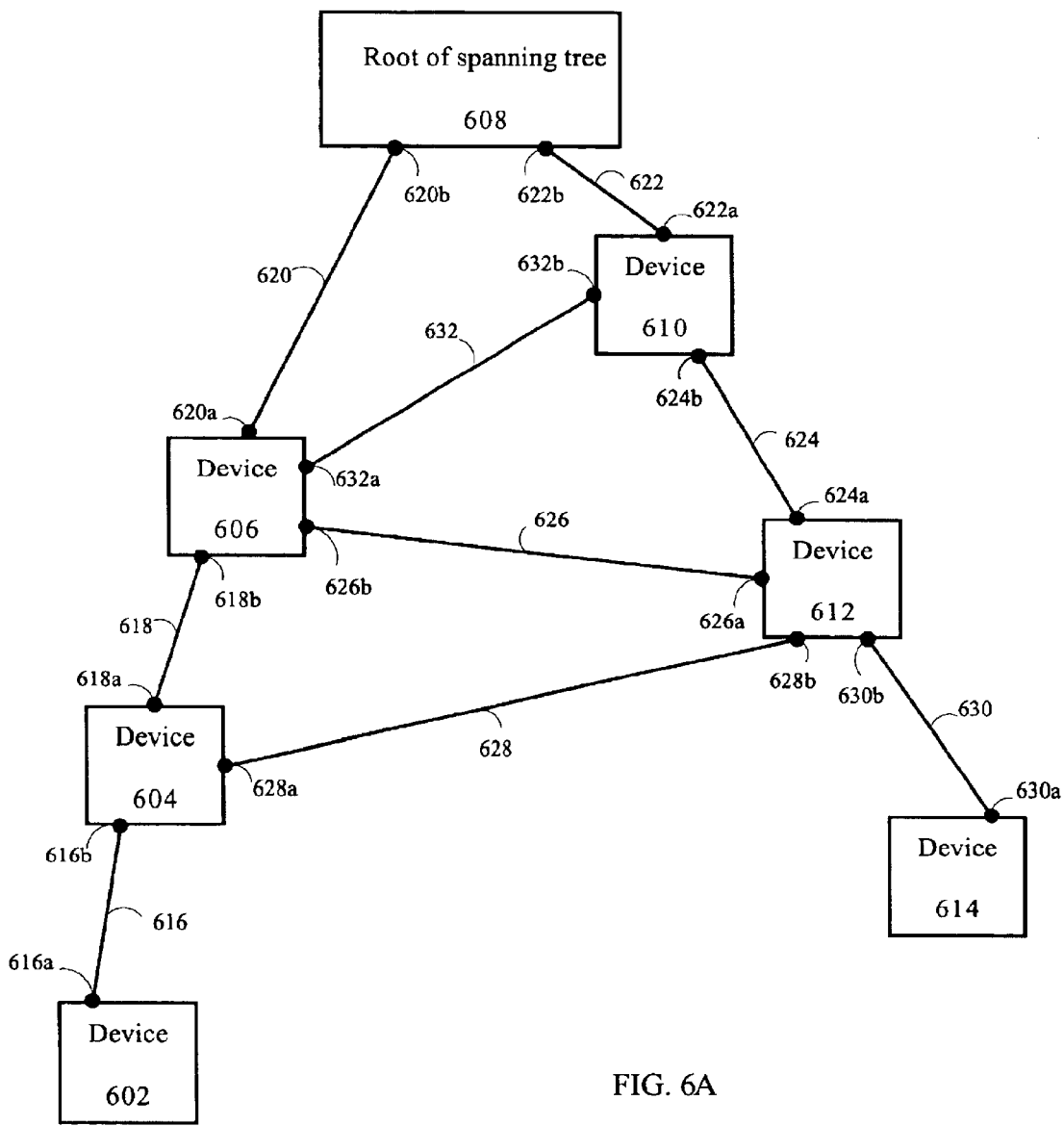
FIG. 6A is a block diagram that illustrates the process of tracing a path segment.

FIG. 6A is a block diagram that illustrates the process of tracing a path segment along the Spanning Tree from each node of the contiguous pair to the root of the Spanning Tree.

In FIG. 6A, assume that Device 602 and Device 614 are the nodes of a contiguous pair of Layer 3 devices. Further assume that Device 608 is the Root of the Spanning Tree. Device 604, Device 606, Device 610, and Device 612 are intermediary devices between the source device and the destination device. Device 602 is connected to Device 604 by Connection 616 and through Access Ports 616a and 616b. Device 604 is connected to Device 606 by Connection 618 and through Access Ports 618a and 618b. Also, Device 604 is connected to Device 612 by Connection 628 and through Access Ports 628a and 628b.

Device 606 is connected to Device 608 by Connection 620 and through Access Ports 620a, 620b. Also, Device 606 is connected to Device 612 by Connection 626 and through Access Ports 626a, 626b. Finally, Device 606 is connected to Device 610 by Connection 632 and through Access Ports 632a, 632b.

Device 608 is connected to Device 610 by Connection 622 and through Access Ports 622a and 622b. Device 610 is connected to Device 612 by Connection 624 and through Access Ports 624a, 624b. Device 614 is connected to Device 612 by Connection 630 and through Access Ports 630a, 630b.

Figure 6B:
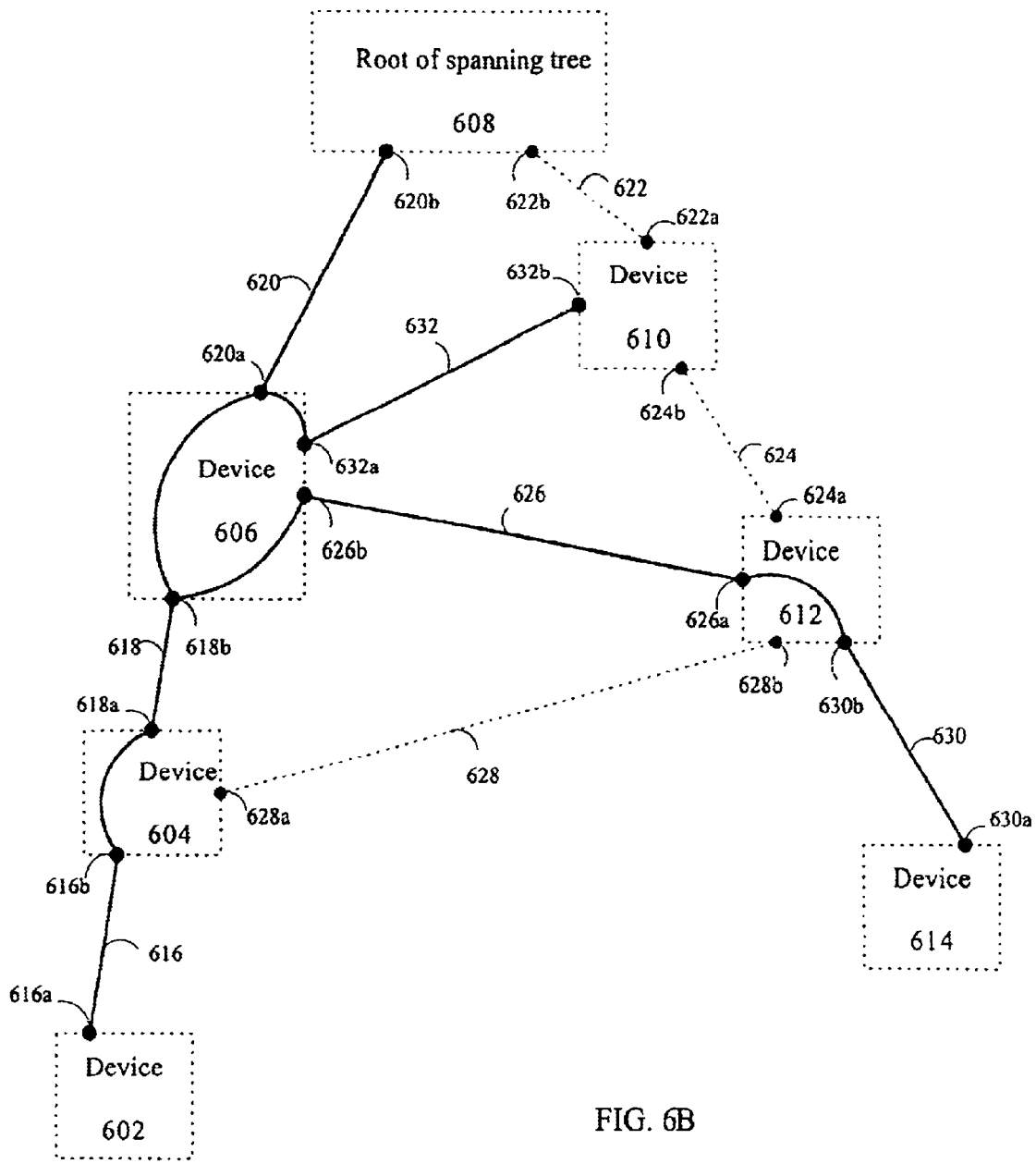
FIG. 6B is a block diagram that illustrates a loop-free Spanning Tree path for the network of FIG. 6A.

For purposes of illustration, assume that Access Ports 622a, 622b, 628a, 628b, 624a, and 624b, are placed in a "blocked state" as a result of applying a Spanning Tree algorithm to the network of FIG. 6A. Thus, the Spanning Tree is indicated by Connection 616, 618, 620, 632, 626, 630 as shown in FIG. 6B.

In this example, the contiguous pair is assumed to be (Device 602, Device 614). By the following the Spanning Tree, the process may trace a path segment from Device 602, which is the first node of the contiguous pair, to the Root of the Spanning Tree, which is Device 608.

Path Segment trace from Device 602 to Device 608=Device 602->Device 604->Device 606->Device 608

Similarly, the process may trace a path segment from Device 614, which is the second node of the contiguous pair, to the Root of the Spanning Tree.

Path Segment trace from Device 614 to Device 608=Device 614->Device 612->Device 606->Device 608

Upon inspection of the above path segment traces, it can be seen that the trace from Device 606->Device 608 is duplicative and thus Device 608 may be treated as an extraneous device in the context of determining subpaths for contiguous pairs.

The two path segments above may be concatenated after eliminating extraneous Device 608 to form the subpath for the contiguous pair, (Device 602, Device 614).

Thus,

Subpath for (Device 602, Device 614)=Device 602->Device 604->Device 606->Device 612->Device 614

3. Non-Trunking Interface to Trunking Interface

Figure 7:
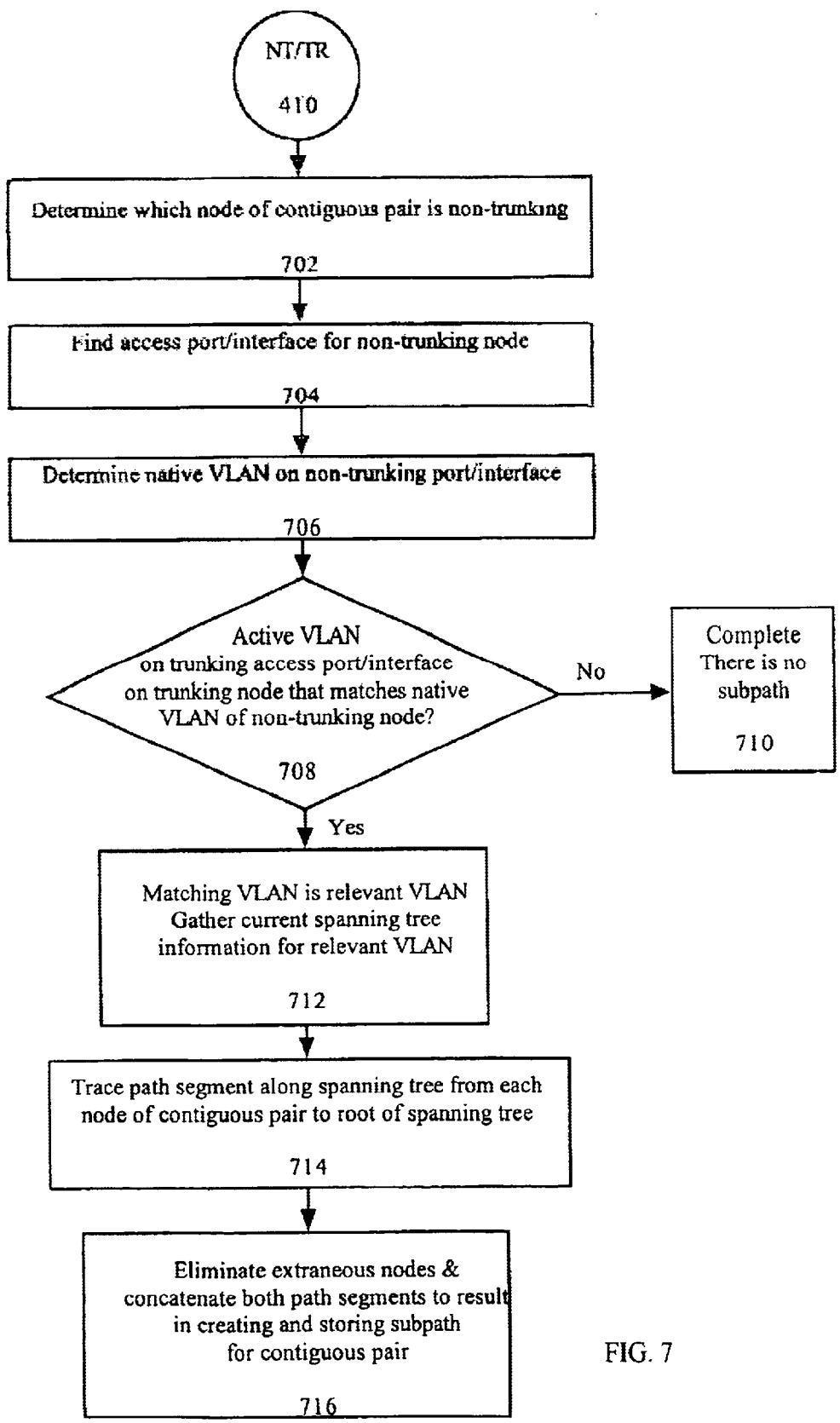
FIG. 7 is a flow chart that illustrates the determination of a subpath when one of the nodes of a contiguous pair has a non-trunking port or interface, and the other node has a trunking port or interface.

FIG. 7 is a flow chart that illustrates the determination of a subpath when one of the nodes of a contiguous pair has a non-trunking port or interface, and the other node has a trunking port or interface. At block 702, the process determines which node of the contiguous pair for a given subnet is non-trunking. At block 704, the process finds the access port or interface for the non-trunking node. At block 706, the process determines the native VLAN of the access port or interface for the non-trunking node of the contiguous pair.

At block 708, the process determines whether there is an active VLAN on the trunking access port or interface on the trunking node, and which matches the native VLAN of the non-trunking node. If the process determines that there in no matching VLAN, then the process of FIG. 7 is complete, and there is no subpath as indicated by block 710. However, if the process determines that there is an active VLAN on the trunking node that matches the native VLAN of the non-trunking node, then at block 712, the matching VLAN is the relevant VLAN and the process gathers the current Spanning Tree information for the relevant VLAN.

At block 714, the process traces a path segment along the Spanning Tree from each node of the contiguous pair to the root of the Spanning Tree. The process of tracing a path segment along the Spanning Tree is previously described above with reference to FIG. 6A and FIG. 6B.

At block 716, the process eliminates extraneous nodes and concatenates the two path segments that were traced at block 714 to result in creating and storing the subpath for the given contiguous pair. The process of eliminating extraneous nodes and concatenating the path segments has been described with reference to FIG. 6A and FIG. 6B.

4. Trunking Interface to Trunking Interface

Figure 8:
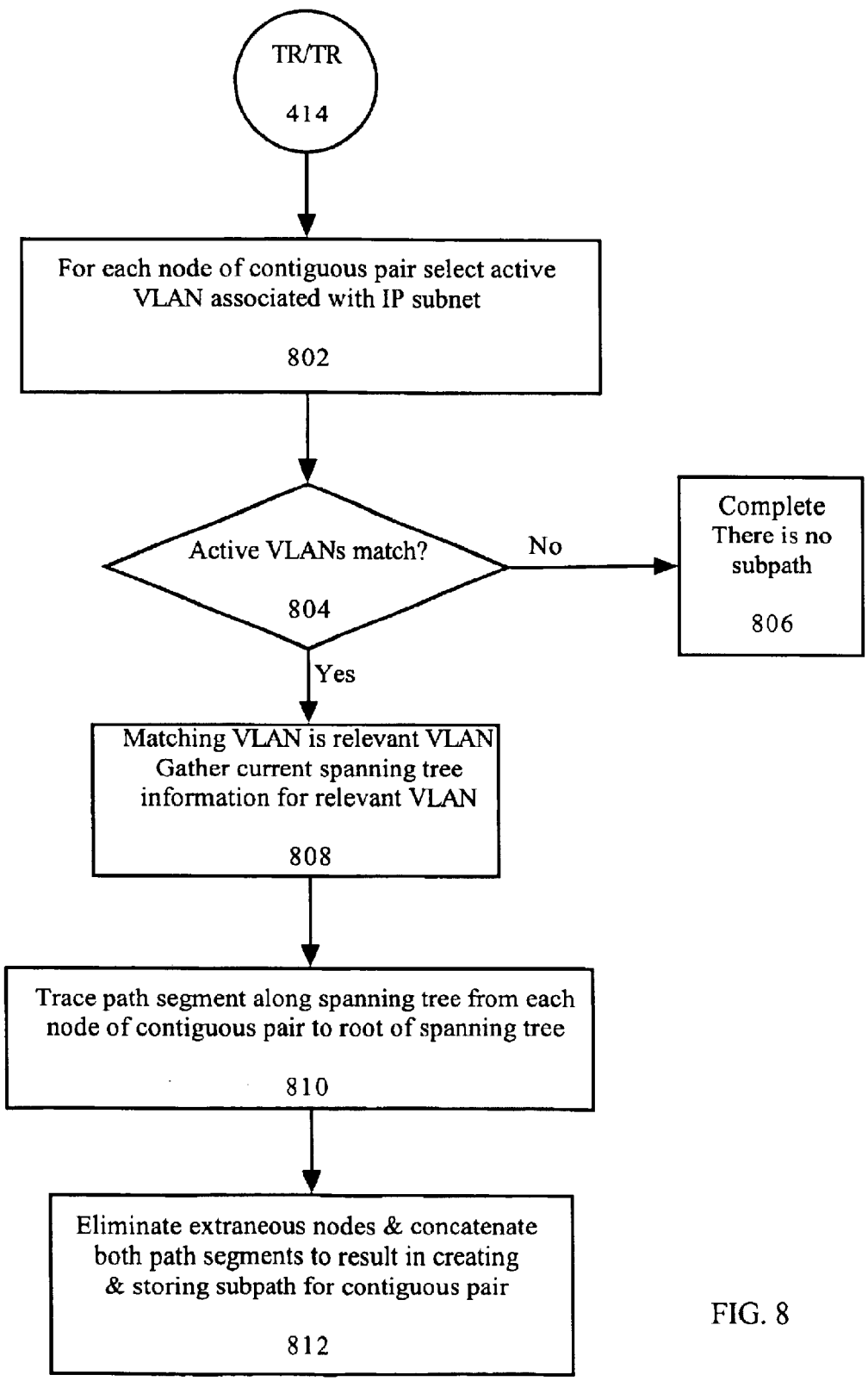
FIG. 8 is a flow chart that illustrates the determination of a subpath when both nodes of a contiguous pair have non-trunking ports or interfaces.

FIG. 8 is a flow chart that illustrates the determination of a subpath when both nodes of a contiguous pair have non-trunking ports or interfaces. At block 802, for each node of the contiguous pair, the process selects the active VLAN associated with the IP subnet to which the contiguous pair belongs. At block 804, the process determines whether the active VLANs that are selected at block 802 match.

If the process determines that the active VLANs do not match, then the process of FIG. 8 is complete, and there is no subpath as indicated by block 806. However, if the process determines that the active VLANs match, then at block 808, the matching VLAN is the relevant VLAN, and the process gathers the current Spanning Tree information for the relevant VLAN.

At block 810, the process traces a path segment along the Spanning Tree from each node of the contiguous pair to the root of the Spanning Tree. The process of tracing a path segment along the Spanning Tree is previously described above with reference to FIG. 6A and FIG. 6B.

At block 812, the process eliminates extraneous nodes and concatenates the two path segments that were traced at block 810 to form the subpath for the given contiguous pair. The process of eliminating extraneous nodes and concatenating the path segments is previously described above with reference to FIG. 6A and FIG. 6B.

Later 2 Path

Figure 9:
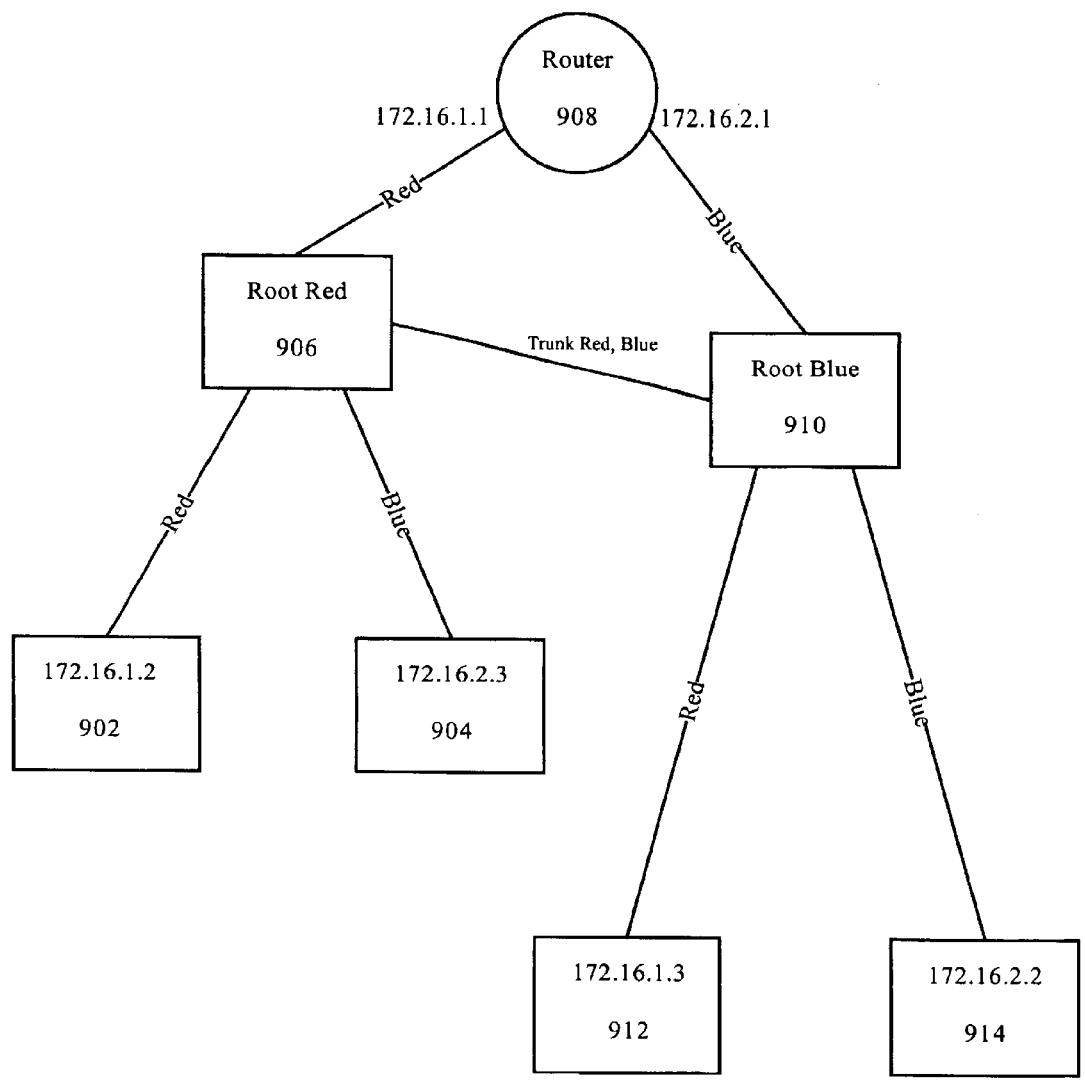
FIG. 9 is a block diagram that illustrates a network that is configured in a one-to-one mapping between IP subnets and VLANs.

Once the subpaths are determined, extraneous nodes are eliminated and the subpaths are concatenated to form a Layer 2 path between a source device and a destination device. Two examples of a Layer 2 path analysis embodying some of the processes previously described above will be illustrated with reference to FIG. 9. FIG. 9 is a block diagram that illustrates a network that is configured in a one-to-one mapping between IP subnets and VLANs.

In FIG. 9, for purposes of illustration assume that Devices 902, 912 are source devices and Devices 904, 914 are destination devices. Further assume that the IP addresses of the devices are as follows:

IP address of Device 902=172.16.1.2
IP address of Device 904=172.16.2.3
IP address of Device 912=172.16.1.3
IP address of Device 914=172.16.2.2

Thus, Device 902 and Device 912 belong to the same subnet, namely, the 172.16.1 subnet. Similarly, Device 904 and Device 914 belong to the 172.16.2 subnet. Also, assume that the network of FIG. 9 is configured with two VLANs named VLAN RED and VLAN BLUE. Further assume that VLAN RED is mapped to the 172.16.1 subnet and VLAN Blue is mapped to the 172.16.2 subnet.

Switch 906 is the root of VLAN RED and Switch 910 is the root of VLAN BLUE. Assume that Switches 906 and 910 have trunking access ports or interfaces. In particular, Switches 906 and 910 are capable of trunking between VLAN RED and VLAN BLUE. Router 908 routes packets between VLAN RED and VLAN BLUE.

The Layer 2 path analysis for a packet emanating from Device 902 and destined for Device 914 is as follows:

Layer 3 path between Device 902 and Device 914=Device 902->Router 908->Device 914

Contiguous pairs are: (Device 902, Router 908) and (Router 908, Device 914) Active VLAN associated with IP subnet of (Device 902, Router 908) is: VLAN RED Path Segment trace along Spanning tree from node Device 902 to Root of VLAN RED is: Device 902->Switch 906

Path Segment trace along Spanning tree from node Router 908 to Root of VLAN RED is: Router 908->Switch 906

Thus, subpath of (Device 902, Router 908) is: Device 902->Switch 906->Router 908

Active VLAN associated with IP subnet of (Router 908, Device 914) is: VLAN BLUE Path Segment trace along Spanning tree from node Router 908 to Root of VLAN BLUE is: Router 908->Switch 910

Path Segment trace along Spanning tree from node Device 914 to Root of VLAN BLUE is: Device 914->Switch 910

Thus, subpath of (Router 908, Device 914) is: Router 908->Switch 910->Device 914

Thus, Layer 2 path between Device 902 to Device 914 is:

subpath of (Device 902, Router 908)+subpath of (Router 908, Device 914)=Device 902->Switch 906->Router 908->Switch 910->Device 914

The Layer 2 path analysis for a packet emanating from Device 902 and destined for Device 904 is as follows:

Layer 3 path between Device 902 and Device 904=Device 902->Router 908->Device 904

Contiguous pairs are: (Device 902, Router 908) and (Router 908, Device 904) Active VLAN associated with IP subnet of (Device 902, Router 908) is: VLAN RED Path Segment trace along Spanning tree from node Device 902 to Root of VLAN RED is: Device 902->Switch 906

Path Segment trace along Spanning tree from node Router 908 to Root of VLAN RED is: Router 908->Switch 906

Thus, subpath of (Device 902, Router 908) is: Device 902->Switch 906->Router 908

Active VLAN associated with IP subnet of (Router 908, Device 904) is: VLAN BLUE Path Segment trace along Spanning tree from node Router 908 to Root of VLAN BLUE is: Router 908->Switch 910.

Path Segment trace along Spanning tree from node Device 904 to Root of VLAN BLUE is: Device 904->Switch 906->(trunking)->Switch 910

Thus, subpath of (Router 908, Device 914) is: Router 908->Switch 910->Switch 906->Device 904

Thus, Layer 2 path between Device 902 to Device 904 is:

subpath of (Device 902, Router 908)+subpath of (Router 908, Device 904) =Device 902->Switch 906->Router 908->Switch 910->Switch 906->Device 904

Hardware Overview

Figure 10:
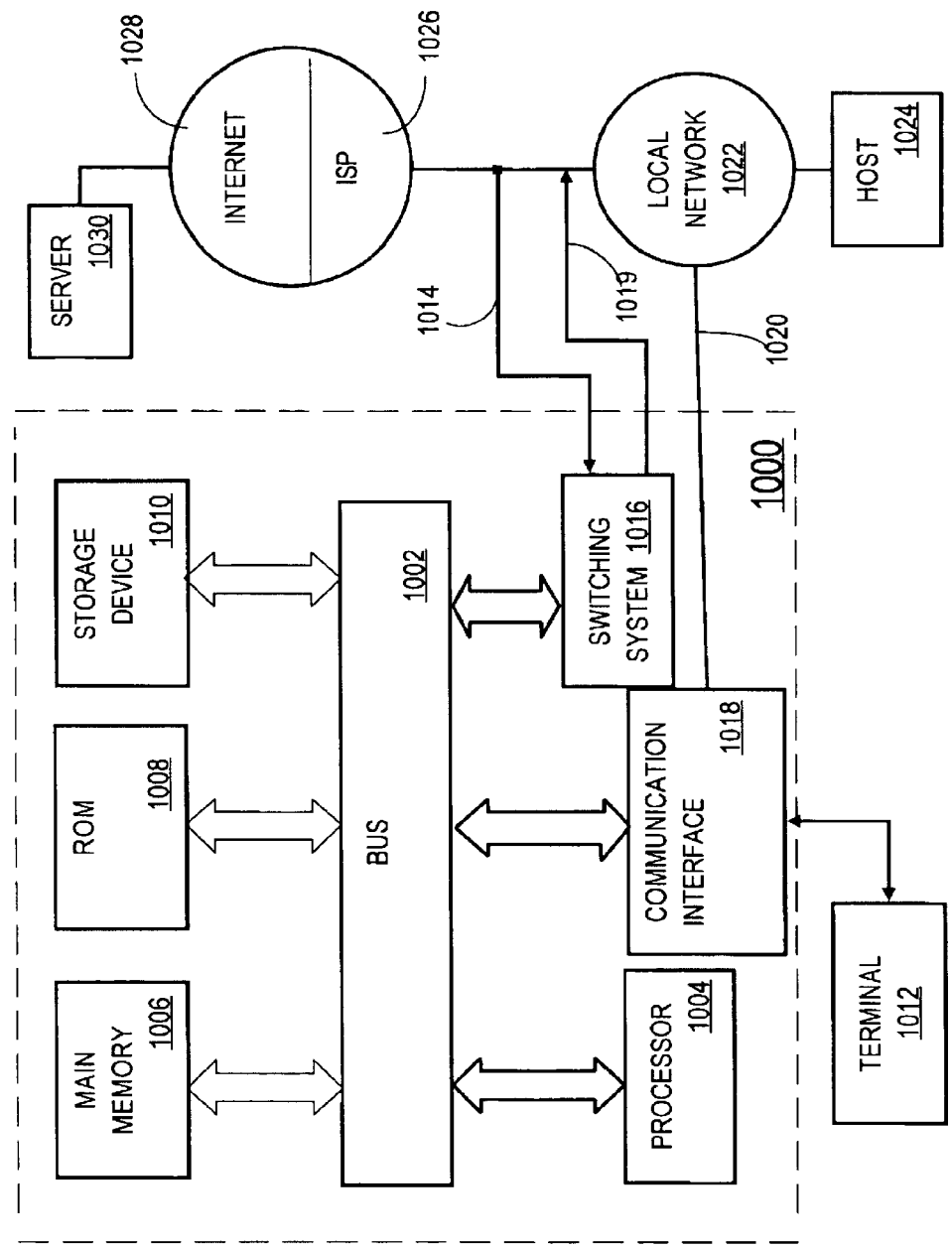
FIG. 10 is a block diagram that illustrates a computer system upon which an embodiment may be implemented.

FIG. 10 is a block diagram that illustrates a computer system 1000 upon which an embodiment of the invention may be implemented. Computer system 1000 includes a bus 1002 or other communication process for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for analyzing a Layer 2 path in a switched network. According to one embodiment of the invention, analyzing a Layer 2 path in a switched network is provided by computer system 1000 in response to a processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. In accordance with the invention, one such downloaded application provides for analyzing a Layer 2 path in a switched network as described herein.

The received code may be executed by processor 1004 as it is received, and/or stored in storage device 1010, or other non-volatile storage for later execution. In this manner, computer system 1000 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of determining a Layer 2 path between a source device and a destination device in a switched network, the method comprising the computer-implemented steps of:

determining a Layer 3 path between the source device and the destination device, wherein the Layer 3 path comprises information identifying two or more Layer 3 devices;

determining a subpath for each contiguous pair of Layer 3 devices in the Layer 3 path, based on a spanning tree that is associated with a relevant VLAN for said each contiguous pair of layer 3 devices; and concatenating the subpaths to result in creating and storing information representing the Layer 2 path.

2. The method as recited in claim 1, wherein determining a subpath for each contiguous pair of Layer 3 devices comprises the steps of:

determining a first interface on a first node of the contiguous pair that is connected to a second interface on a second node of the contiguous pair for a given subnet; and selecting the relevant VLAN between the first and second nodes of the contiguous pair based on the first and second interfaces; and gathering current spanning tree information for the relevant VLAN.

3. The method as recited in claim 2, wherein selecting the relevant VLAN between the first and second nodes of the contiguous pair comprises the steps of:

selecting a matching native VLAN of the first and second nodes of the contiguous pair as the relevant VLAN when the first interface and the second interface of the first and second nodes respectively of the contiguous pair are non-VLAN trunking interfaces;

selecting a matching active VLAN that is designated to carry traffic to a next hop as the relevant VLAN when the first interface and the second interface of the first and second nodes respectively of the contiguous pair are VLAN trunking interfaces; and selecting a native VLAN that is on a non-VLAN trunking interface as the relevant VLAN when one of the first and second nodes of the contiguous pair has the non-VLAN trunking interface.

4. The method as recited in claim 1, wherein determining a subpath for each contiguous pair of Layer 3 devices further comprises the steps of:

tracing a first path segment from a first node of the contiguous pair by following the spanning tree associated with the relevant VLAN for the contiguous pair to a root of the spanning tree;

tracing a second path segment from a second node of the contiguous pair by following the spanning tree associated with the relevant VLAN for the contiguous pair to the root of the spanning tree; and concatenating the first and second path segments to result in creating and storing the subpath for the contiguous pair.

5. The method as recited in claim 4, wherein concatenating the first path segment and the second path segment to result in creating and storing the subpath for the contiguous pair includes the step of eliminating extraneous devices from the first and second path segments.

6. The method as recited in claim 1, wherein concatenating the subpaths to result in creating and storing information representing the Layer 2 path includes the step of eliminating extraneous devices from the subpaths.

7. A method of determining a Layer 2 path between a source device and a destination device in a switched network, the method comprising the computerimplemented steps of:

determining a Layer 3 path between the source device and the destination device, wherein the Layer 3 path comprises information identifying two or more Layer 3 devices;

identifying contiguous pairs of Layer 3 devices in the Layer 3 path;

determining a subpath for each contiguous pair of Layer 3 devices in the Layer 3 path;

determining whether any contiguous pair of Layer 3 devices has no subpath;

concluding that there is no Layer 2 path when any contiguous pair of Layer 3 devices has no subpath;

eliminating extraneous devices in the subpaths; and concatenating the subpaths to result in creating and storing information representing the Layer 2 path when each of the contiguous pairs of Layer 3 devices has a subpath.

8. The method as recited in claim 7, wherein determining a subpath for each contiguous pair of Layer 3 devices comprises the steps of:

determining a first interface on a first node of the contiguous pair that is connected to a second interface on a second node of the contiguous pair for a given subnet when both the first node of the contiguous pair and the second node of the contiguous pair have non-trunking interfaces;

determining a first native VLAN of the first interface and a second native VLAN the second interface;

determining whether the first native VLAN matches the second native VLAN;

selecting the matching VLAN as a relevant VLAN between the first and second nodes of the contiguous pair when the first native VLAN matches the second native VLAN;

gathering a current spanning tree information for the relevant VLAN;

tracing a first path segment from the first node of the contiguous pair to a root of the spanning tree by following the current spanning tree information associated with the relevant VLAN to the root of the spanning tree;

tracing a second path segment from the second node of the contiguous pair to the root of the spanning tree by following the current spanning tree information associated with the relevant VLAN;

eliminating extraneous devices in the first and second path segments; and concatenating the first path segment and the second path segment to result in creating and storing the subpath for the contiguous pair.

9. The method as recited in claim 7, wherein determining a subpath for each contiguous pair of Layer 3 devices comprises the steps of:

determining a non-trunking node of the contiguous pair when one of the nodes of the contiguous pair for a given subnet has a non-trunking interface and the other node of the contiguous pair has a trunking interface;

determining the non-trunking interface on the non-trunking node of the contiguous pair as a first interface that is connected to a second interface on the other node of the contiguous pair;

determining a native VLAN on the first interface;

determining whether there is an active VLAN on the second interface that matches the native VLAN on the first interface;

selecting the matching VLAN as a relevant VLAN between the non-trunking node and the other node of the contiguous pair when there is an active VLAN on the second interface that matches the native VLAN on the first interface;

gathering a current spanning tree information for the relevant VLAN;

tracing a first path segment from the non-trunking node of the contiguous pair to a root of the spanning tree by following the current spanning tree information associated with the relevant VLAN to the root of the spanning tree;

tracing a second path segment from the other node of the contiguous pair to the root of the spanning tree by following the current spanning tree information associated with the relevant VLAN;

eliminating extraneous devices in the first and second path segments; and concatenating the first path segment and the second path segment to result in creating and storing the subpath for the contiguous pair.

10. The method as recited in claim 7, wherein determining a subpath for each contiguous pair of Layer 3 devices comprises the steps of:

determining a first interface on a first node of the contiguous pair that is connected to a second interface on a second node of the contiguous pair for a given subnet when both the first node of the contiguous pair and the second node of the contiguous pair have non-trunking interfaces; and determining a first active VLAN of the first interface associated with the given subnet and a second active VLAN the second interface associated with the given subnet;

determining whether the first active VLAN matches the second active VLAN;

selecting the matching VLAN as a relevant VLAN between the first and second nodes of the contiguous pair when the first active VLAN matches the second active VLAN;

gathering a current spanning tree information for the relevant VLAN;

tracing a first path segment from the first node of the contiguous pair to a root of the spanning tree by following the current spanning tree information associated with the relevant VLAN to the root of the spanning tree;

tracing a second path segment from the second node of the contiguous pair to the root of the spanning tree by following the current spanning tree information associated with the relevant VLAN;

eliminating extraneous devices in the first and second path segments; and concatenating the first path segment and the second path segment to result in creating and storing the subpath for the contiguous pair.

11. A computer-readable medium carrying one or more sequences of one or more instructions for determining a Layer 2 path between a source device and a destination device in a switched network, the one or more sequences of one or more instructions including instructions which, when executed by one or more processors, cause the one or more processors to perform the steps of:

determining a Layer 3 path between the source device and the destination device, wherein the Layer 3 path comprises information identifying two or more Layer 3 devices;

determining a subpath for each contiguous pair of Layer 3 devices in the Layer 3 path, based on a spanning tree that is associated with a relevant VLAN for said each contiguous pair of Layer 3 devices; and concatenating the subpaths to result in creating and storing information representing the Layer 2 path.

12. The computer-readable medium as recited in claim 11, wherein determining a subpath for each contiguous pair of Layer 3 devices comprises the steps of:

determining a first interface on a first node of the contiguous pair that is connected to a second interface on a second node of the contiguous pair for a given subnet; and selecting the relevant VLAN between the first and second nodes of the contiguous pair based on the first and second interfaces; and gathering current spanning tree information for the relevant VLAN.

13. The computer-readable medium as recited in claim 12, wherein selecting the relevant VLAN between the first and second nodes of the contiguous pair comprises the steps of:

selecting a matching native VLAN of the first and second nodes of the contiguous pair as the relevant VLAN when the first interface and the second interface of the first and second nodes respectively of the contiguous pair are non-VLAN trunking interfaces;

selecting a matching active VLAN that is designated to carry traffic to a next hop as the relevant VLAN when the first interface and the second interface of the first and second nodes respectively of the contiguous pair are VLAN trunking interfaces; and selecting a native VLAN that is on a non-VLAN trunking interface as the relevant VLAN when one of the first and second nodes of the contiguous pair has the non-VLAN trunking interface.

14. The computer-readable medium as recited in claim 11, wherein determining a subpath for each contiguous pair of Layer 3 devices further comprises the steps of:

tracing a first path segment from a first node of the contiguous pair by following the spanning tree associated with the relevant VLAN for the contiguous pair to a root of the spanning tree;

tracing a second path segment from a second node of the contiguous pair by following the spanning tree associated with the relevant VLAN for the contiguous pair to the root of the spanning tree; and concatenating the first and second path segments to result in creating and storing the subpath for the contiguous pair.

15. The computer-readable medium as recited in claim 14, wherein concatenating the first path segment and the second path segment to result in creating and storing the subpath for the contiguous pair includes the step of eliminating extraneous devices from the first and second path segments.

16. The computer-readable medium as recited in claim 11, wherein concatenating the subpaths to result in creating and storing information representing the Layer 2 path includes the step of eliminating extraneous devices from the subpaths.

17. A computer-readable medium carrying one or more sequences of one or more instructions for determining a Layer 2 path between a source device and a destination device in a switched network, the one or more sequences of one or more instructions including instructions which, when executed by one or more processors, cause the one or more processors to perform the steps of:

determining a Layer 3 path between the source device and the destination device, wherein the Layer 3 path comprises information identifying two or more Layer 3 devices;

identifying contiguous pairs of Layer 3 devices in the Layer 3 path;

determining a subpath for each contiguous pair of Layer 3 devices in the Layer 3 path;

determining whether any contiguous pair of Layer 3 devices has no subpath;

concluding that there is no Layer 2 path when any contiguous pair of Layer 3 devices has no subpath;

eliminating extraneous devices in the subpaths; and concatenating the subpaths to result in creating and storing information representing the Layer 2 path when each of the contiguous pairs of Layer 3 devices has a subpath.

18. The computer-readable medium as recited in claim 17, wherein determining a subpath for each contiguous pair of Layer 3 devices comprises the steps of:

determining a first interface on a first node of the contiguous pair that is connected to a second interface on a second node of the contiguous pair for a given subnet when both the first node of the contiguous pair and the second node of the contiguous pair have non-trunking interfaces;

determining a first native VLAN of the first interface and a second native VLAN the second interface;

determining whether the first native VLAN matches the second native VLAN;

selecting the matching VLAN as a relevant VLAN between the first and second nodes of the contiguous pair when the first native VLAN matches the second native VLAN;

gathering a current spanning tree information for the relevant VLAN;

tracing a first path segment from the first node of the contiguous pair to a root of the spanning tree by following the current spanning tree information associated with the relevant VLAN to the root of the spanning tree;

tracing a second path segment from the second node of the contiguous pair to the root of the spanning tree by following the current spanning tree information associated with the relevant VLAN;

eliminating extraneous devices in the first and second path segments; and concatenating the first path segment and the second path segment to result in creating and storing the subpath for the contiguous pair.

19. The computer-readable medium as recited in claim 17, wherein determining a subpath for each contiguous pair of Layer 3 devices comprises the steps of:

determining a non-trunking node of the contiguous pair when one of the nodes of the contiguous pair for a given subnet has a non-trunking interface and the other node of the contiguous pair has a trunking interface;

determining the non-trunking interface on the non-trunking node of the contiguous pair as a first interface that is connected to a second interface on the other node of the contiguous pair;

determining a native VLAN on the first interface;

determining whether there is an active VLAN on the second interface that matches the native VLAN on the first interface;

selecting the matching VLAN as a relevant VLAN between the non-trunking node and the other node of the contiguous pair when there is an active VLAN on the second interface that matches the native VLAN on the first interface;

gathering a current spanning tree information for the relevant VLAN;

tracing a first path segment from the non-trunking node of the contiguous pair to a root of the spanning tree by following the current spanning tree information associated with the relevant VLAN to the root of the spanning tree;

tracing a second path segment from the other node of the contiguous pair to the root of the spanning tree by following the current spanning tree information associated with the relevant VLAN;

eliminating extraneous devices in the first and second path segments; and concatenating the first path segment and the second path segment to result in creating and storing the subpath for the contiguous pair.

20. The computer-readable medium as recited in claim 17, wherein determining a subpath for each contiguous pair of Layer 3 devices comprises the steps of:

determining a first interface on a first node of the contiguous pair that is connected to a second interface on a second node of the contiguous pair for a given subnet when both the first node of the contiguous pair and the second node of the contiguous pair have non-trunking interfaces; and determining a first active VLAN of the first interface associated with the given subnet and a second active VLAN the second interface associated with the given subnet;

determining whether the first active VLAN matches the second active VLAN;

selecting the matching VLAN as a relevant VLAN between the first and second nodes of the contiguous pair when the first active VLAN matches the second active VLAN;

gathering a current spanning tree information for the relevant VLAN;

tracing a first path segment from the first node of the contiguous pair to a root of the spanning tree by following the current spanning tree information associated with the relevant VLAN to the root of the spanning tree;

tracing a second path segment from the second node of the contiguous pair to the root of the spanning tree by following the current spanning tree information associated with the relevant VLAN;

eliminating extraneous devices in the first and second path segments; and concatenating the first path segment and the second path segment to result in creating and storing the subpath for the contiguous pair.

21. A computer apparatus comprising:

a processor; and a memory coupled to the processor, the memory containing one or more sequences of instructions for determining a Layer 2 path between a source device and a destination device in a switched network, wherein execution of the one or more sequences of instructions by the processor causes the processor to perform the steps of:

determining a Layer 3 path between the source device and the destination device, wherein the Layer 3 path comprises information identifying two or more Layer 3 devices;

determining a subpath for each contiguous pair of Layer 3 devices in the Layer 3 path, based on a spanning tree that is associated with a relevant VLAN for said each contiguous pair of Layer 3 devices; and concatenating the subpaths to result in creating and storing information representing the Layer 2 path.

22. The computer apparatus as recited in claim 21, wherein the one or more sequences of instructions for determining a subpath for each contiguous pair of Layer 2 devices further comprise one or more sequences of instructions which, when executed by the processor causes the process to perform the steps of:

determining a first interface on a first node of the contiguous pair that is connected to a second interface on a second node of the contiguous pair for a given subnet; and selecting the relevant VLAN between the first and second nodes of the contiguous pair based on the first and second interfaces; and gathering said current spanning tree information for the relevant VLAN.

23. The computer apparatus as recited in claim 22, wherein the one or more sequences of instructions for selecting the relevant VLAN between the first and second nodes of the contiguous pair further comprise one or more sequences of instructions which, when executed by the processor causes the process to perform the steps of:

selecting a matching native VLAN of the first and second nodes of the contiguous pair as the relevant VLAN when the first interface and the second interface of the first and second nodes respectively of the contiguous pair are non-VLAN trunking interfaces;

selecting a matching active VLAN that is designated to carry traffic to a next hop as the relevant VLAN when the first interface and the second interface of the first and second nodes respectively of the contiguous pair are VLAN trunking interfaces; and selecting a native VLAN that is on a non-VLAN trunking interface as the relevant VLAN when one of the first and second nodes of the contiguous pair has the non-VLAN trunking interface.

24. The computer apparatus as recited in claim 21, wherein the one or more sequences of instructions for determining a subpath for each contiguous pair of Layer 2 devices further comprise one or more sequences of instructions which, when executed by the processor causes the process to perform the steps of:

tracing a first path segment from a first node of the contiguous pair by following the spanning tree associated with the relevant VLAN for the contiguous pair to a root of the spanning tree;

tracing a second path segment from a second node of the contiguous pair by following the spanning tree associated with the relevant VLAN for the contiguous pair to the root of the spanning tree; and concatenating the first and second path segments to result in creating and storing the subpath for the contiguous pair.

25. The computer apparatus as recited in claim 24, wherein the one or more sequences of instructions for concatenating the first path segment and the second path segment to result in creating and storing the subpath for the contiguous pair further include one or more sequences of instructions for eliminating extraneous devices from the first and second path segments.

26. The computer apparatus as recited in claim 21, wherein the one or more sequences of instructions for concatenating the subpaths to result in creating and storing information representing the Layer 2 path further include one or more sequences of instructions for eliminating extraneous devices from the subpaths.

27. A network device that can determine a Layer 2 path between a source device and a destination device in a switched network comprising:

a network interface;

a processor coupled to the network interface and receiving information from the network interface; and a computer-readable medium accessible by the processor and comprising one or more sequences of instructions which, when executed by the processor, cause the processor to carry out the steps of:

determining a Layer 3 path between the source device and the destination device, wherein the Layer 3 path comprises information identifying two or more Layer 3 devices;

identifying contiguous pairs of Layer 3 devices in the Layer 3 path;

determining a subpath for each contiguous pair of Layer 3 devices in the Layer 3 path;

determining whether any contiguous pair of Layer 3 devices has no subpath;

concluding that there is no Layer 2 path when any contiguous pair of Layer 3 devices has no subpath;

eliminating extraneous devices in the subpaths; and concatenating the subpaths to result in creating and storing information representing the Layer 2 path when each of the contiguous pairs of Layer 3 devices has a subpath.

28. The network device as recited in claim 27, wherein the one or more sequences of instructions for determining a subpath for each contiguous pair of Layer 3 devices further comprise one or more sequences of instructions which, when executed by the processor, cause the processor to carry out the steps of:

determining a first interface on a first node of the contiguous pair that is connected to a second interface on a second node of the contiguous pair for a given subnet when both the first node of the contiguous pair and the second node of the contiguous pair have non-trunking interfaces;

determining a first native VLAN of the first interface and a second native VLAN the second interface;

determining whether the first native VLAN matches the second native VLAN;

selecting the matching VLAN as a relevant VLAN between the first and second nodes of the contiguous pair when the first native VLAN matches the second native VLAN;

gathering a current spanning tree information for the relevant VLAN;

tracing a first path segment from the first node of the contiguous pair to a root of the spanning tree by following the current spanning tree information associated with the relevant VLAN to the root of the spanning tree;

tracing a second path segment from the second node of the contiguous pair to the root of the spanning tree by following the current spanning tree information associated with the relevant VLAN;

eliminating extraneous devices in the first and second path segments; and concatenating the first path segment and the second path segment to result in creating and storing the subpath for the contiguous pair.

29. The network device as recited in claim 27, wherein the one or more sequences of instructions for determining a subpath for each contiguous pair of Layer 3 devices further comprises one or more sequences of instructions which, when executed by the processor, cause the processor to carry out the steps of:

determining a non-trunking node of the contiguous pair when one of the nodes of the contiguous pair for a given subnet has a non-trunking interface and the other node of the contiguous pair has a trunking interface;

determining the non-trunking interface on the non-trunking node of the contiguous pair as a first interface that is connected to a second interface on the other node of the contiguous pair;

determining a native VLAN on the first interface;

determining whether there is an active VLAN on the second interface that matches the native VLAN on the first interface;

selecting the matching VLAN as a relevant VLAN between the non-trunking node and the other node of the contiguous pair when there is an active VLAN on the second interface that matches the native VLAN on the first interface;

gathering a current spanning tree information for the relevant VLAN;

tracing a first path segment from the non-trunking node of the contiguous pair to a root of the spanning tree by following the current spanning tree information associated with the relevant VLAN to the root of the spanning tree;

tracing a second path segment from the other node of the contiguous pair to the root of the spanning tree by following the current spanning tree information associated with the relevant VLAN;

eliminating extraneous devices in the first and second path segments; and concatenating the first path segment and the second path segment to result in creating and storing the subpath for the contiguous pair.

30. The network device as recited in claim 27, wherein the one or more sequences of instructions for determining a subpath for each contiguous pair of Layer 3 devices further comprise one or more sequences of instructions which, when executed by the processor, cause the processor to carry out the steps of:

determining a first interface on a first node of the contiguous pair that is connected to a second interface on a second node of the contiguous pair for a given subnet when both the first node of the contiguous pair and the second node of the contiguous pair have non-trunking interfaces; and determining a first active VLAN of the first interface associated with the given subnet and a second active VLAN the second interface associated with the given subnet;

determining whether the first active VLAN matches the second active VLAN;

selecting the matching VLAN as a relevant VLAN between the first and second nodes of the contiguous pair when the first active VLAN matches the second active VLAN;

gathering a current spanning tree information for the relevant VLAN;

tracing a first path segment from the first node of the contiguous pair to a root of the spanning tree by following the current spanning tree information associated with the relevant VLAN to the root of the spanning tree;

tracing a second path segment from the second node of the contiguous pair to the root of the spanning tree by following the current spanning tree information associated with the relevant VLAN;

eliminating extraneous devices in the first and second path segments; and concatenating the first path segment and the second path segment to result in creating and storing the subpath for the contiguous pair.

31. A system for determining a Layer 2 path between a source device and a destination device in a switched network, the system comprising:

means for determining a Layer 3 path between the source device and the destination device, wherein the Layer 3 path comprises information identifying two or more Layer 3 devices;

means for identifying contiguous pairs of Layer 3 devices in the Layer 3 path;

means for determining a subpath for each contiguous pair of Layer 3 devices in the Layer 3 path;

means for determining whether any contiguous pair of Layer 3 devices has no subpath;

means for concluding that there is no Layer 2 path when any contiguous pair of Layer 3 devices has no subpath;

means for eliminating extraneous devices in the subpaths; and means for concatenating the subpaths to result in creating and storing information representing the Layer 2 path when each of the contiguous pairs of Layer 3 devices has a subpath.

32. The system as recited in claim 31, wherein the means for determining a subpath for each contiguous pair of Layer 3 devices further comprises:

means for determining a first interface on a first node of the contiguous pair that is connected to a second interface on a second node of the contiguous pair for a given subnet when both the first node of the contiguous pair and the second node of the contiguous pair have non-trunking interfaces;

means for determining a first native VLAN of the first interface and a second native VLAN the second interface;

means for determining whether the first native VLAN matches the second native VLAN;

means for selecting the matching VLAN as a relevant VLAN between the first and second nodes of the contiguous pair when the first native VLAN matches the second native VLAN;

means for gathering a current spanning tree information for the relevant VLAN;

means for tracing a first path segment from the first node of the contiguous pair to a root of the spanning tree by following the current spanning tree information associated with the relevant VLAN to the root of the spanning tree;

means for tracing a second path segment from the second node of the contiguous pair to the root of the spanning tree by following the current spanning tree information associated with the relevant VLAN;

means for eliminating extraneous devices in the first and second path segments; and means for concatenating the first path segment and the second path segment to result in creating and storing the subpath for the contiguous pair.

33. The system as recited in claim 31, wherein the means for determining a subpath for each contiguous pair of Layer 3 devices further comprises:

means for determining a non-trunking node of the contiguous pair when one of the nodes of the contiguous pair for a given subnet has a non-trunking interface and the other node of the contiguous pair has a trunking interface;

means for determining the non-trunking interface on the non-trunking node of the contiguous pair as a first interface that is connected to a second interface on the other node of the contiguous pair;

means for determining a native VLAN on the first interface;

means for determining whether there is an active VLAN on the second interface that matches the native VLAN on the first interface;

means for selecting the matching VLAN as a relevant VLAN between the non-trunking node and the other node of the contiguous pair when there is an active VLAN on the second interface that matches the native VLAN on the first interface;

means for gathering a current spanning tree information for the relevant VLAN;

means for tracing a first path segment from the non-trunking node of the contiguous pair to a root of the spanning tree by following the current spanning tree information associated with the relevant VLAN to the root of the spanning tree;

means for tracing a second path segment from the other node of the contiguous pair to the root of the spanning tree by following the current spanning tree information associated with the relevant VLAN;

means for eliminating extraneous devices in the first and second path segments; and means for concatenating the first path segment and the second path segment to result in creating and storing the subpath for the contiguous pair.

34. The system as recited in claim 31, wherein the means for determining a subpath for each contiguous pair of Layer 3 devices further comprises:

means for determining a first interface on a first node of the contiguous pair that is connected to a second interface on a second node of the contiguous pair for a given subnet when both the first node of the contiguous pair and the second node of the contiguous pair have non-trunking interfaces; and means for determining a first active VLAN of the first interface associated with the given subnet and a second active VLAN the second interface associated with the given subnet;

means for determining whether the first active VLAN matches the second active VLAN;

means for selecting the matching VLAN as a relevant VLAN between the first and second nodes of the contiguous pair when the first active VLAN matches the second active VLAN;

means for gathering a current spanning tree information for the relevant VLAN;

means for tracing a first path segment from the first node of the contiguous pair to a root of the spanning tree by following the current spanning tree information associated with the relevant VLAN to the root of the spanning tree;

means for tracing a second path segment from the second node of the contiguous pair to the root of the spanning tree by following the current spanning tree information associated with the relevant VLAN;

means for eliminating extraneous devices in the first and second path segments; and means for concatenating the first path segment and the second path segment to result in creating and storing the subpath for the contiguous pair.

35. System for determining a Layer 2 path between a source device and a destination device in a switched network, the system comprising:

means for determining a Layer 3 path between the source device and the destination device, wherein the Layer 3 path comprises information identifying two or more Layer 3 devices;

means for determining a subpath for each contiguous pair of Layer 3 devices in the Layer 3 path, based on a spanning tree that is associated with a relevant VLAN for said each contiguous pair of Layer 3 devices; and means for concatenating the subpaths to result in creating and storing information representing the Layer 2 path.

36. The system as recited in claim 35, wherein the means for determining a subpath for each contiguous pair of Layer 3 devices further comprises:

means for determining a first interface on a first node of the contiguous pair that is connected to a second interface on a second node of the contiguous pair for a given subnet; and means for selecting the relevant VLAN between the first and second nodes of the contiguous pair based on the first and second interfaces; and means for gathering said current spanning tree information for the relevant VLAN.

37. The system as recited in claim 36, wherein the means for selecting the relevant VLAN between the first and second nodes of the contiguous pair further comprises:

means for selecting a matching native VLAN of the first and second nodes of the contiguous pair as the relevant VLAN when the first interface and the second interface of the first and second nodes respectively of the contiguous pair are non-VLAN trunking interfaces;

means for selecting a matching active VLAN that is designated to carry traffic to a next hop as the relevant VLAN when the first interface and the second interface of the first and second nodes respectively of the contiguous pair are VLAN trunking interfaces; and means for selecting a native VLAN that is on a non-VLAN trunking interface as the relevant VLAN when one of the first and second nodes of the contiguous pair has the non-VLAN trunking interface.

38. The system as recited in claim 35, wherein the means for determining a subpath for each contiguous pair of Layer 3 devices further comprises:

means for tracing a first path segment from a first node of the contiguous pair by following the spanning tree associated with the relevant VLAN for the contiguous pair to a root of the spanning tree;

means for tracing a second path segment from a second node of the contiguous pair by following the spanning tree associated with the relevant VLAN for the contiguous pair to the root of the spanning tree; and means for concatenating the first and second path segments to result in creating and storing the subpath for the contiguous pair.

39. The system as recited in claim 38, wherein the means for concatenating the first path segment and the second path segment to result in creating and storing the subpath for the contiguous pair includes means for eliminating extraneous devices from the first and second path segments.

40. The system as recited in claim 35, wherein the means for concatenating the subpaths to result in creating and storing information representing the Layer 3 path includes means for eliminating extraneous devices from the subpaths.

* * * * *

UNITED STATES PATENT AND TRADEMARK OFFICE
CERTIFICATE OF CORRECTION

PATENT NO. : 6,944,130 B1
DATED : September 13, 2005
INVENTOR(S) : Chu et al.

It is certified that error appears in the above-identified patent and that said Letters Patent is hereby corrected as shown below:

Column 14,
Line 35, delete "layer 3" and insert -- Layer 3 --.

Column 15,
Line 27, delete "computerimplemented" and insert -- computer-implemented --.

Column 25,
Line 51, delete "System" and insert -- A system --.

Signed and Sealed this

Twenty-fourth Day of January, 2006

JON W. DUDAS
*Director of the United States Patent and Trademark Office*